United States Patent
Ogura

(10) Patent No.: US 8,643,896 B2
(45) Date of Patent: Feb. 4, 2014

(54) IMAGE PROCESSING APPARATUS FOR OUTPUTTING RASTER IMAGE USING A PLURALITY OF PROCESSORS

(75) Inventor: Keigo Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 13/009,273

(22) Filed: Jan. 19, 2011

(65) Prior Publication Data

US 2011/0211204 A1     Sep. 1, 2011

(30) Foreign Application Priority Data

Mar. 1, 2010    (JP) .................................. 2010-044631

(51) Int. Cl.
*H04N 1/60* (2006.01)
*G06K 15/02* (2006.01)
(52) U.S. Cl.
USPC ......................................... 358/1.9; 358/1.16
(58) Field of Classification Search
USPC ............ 358/1.1, 1.9, 2.1, 1.16, 400, 401, 448
See application file for complete search history.

(56) References Cited

U.S. PATENT DOCUMENTS

| | | | |
|---|---|---|---|
| 6,567,182 B1 * | 5/2003 | Kumar et al. | 358/1.15 |
| 7,859,720 B2 | 12/2010 | Yokoyama et al. | |
| 8,339,664 B2 | 12/2012 | Yamazaki | |
| 2008/0084425 A1 | 4/2008 | Ogura | |

FOREIGN PATENT DOCUMENTS

JP    2004157609 A    6/2004
JP    2009-274366 A    11/2009

* cited by examiner

*Primary Examiner* — Thomas D Lee
(74) *Attorney, Agent, or Firm* — Fitzpatrick, Cella, Harper & Scinto

(57) ABSTRACT

The first processor element (PE) interprets a display list, generates pieces of edge information of objects contained in one line, sorts the pieces of edge information for each line, and transfers the level data containing link information linking to width information of between the edges of the objects, the pieces of edge information and overlapping information of the objects. When the level data corresponding to the pixel count in the sub-scanning direction is stored in a memory, a DMAC controls the readout order of the level data to read out the level data from the memory and transfers the readout level data to the second processor.

3 Claims, 31 Drawing Sheets

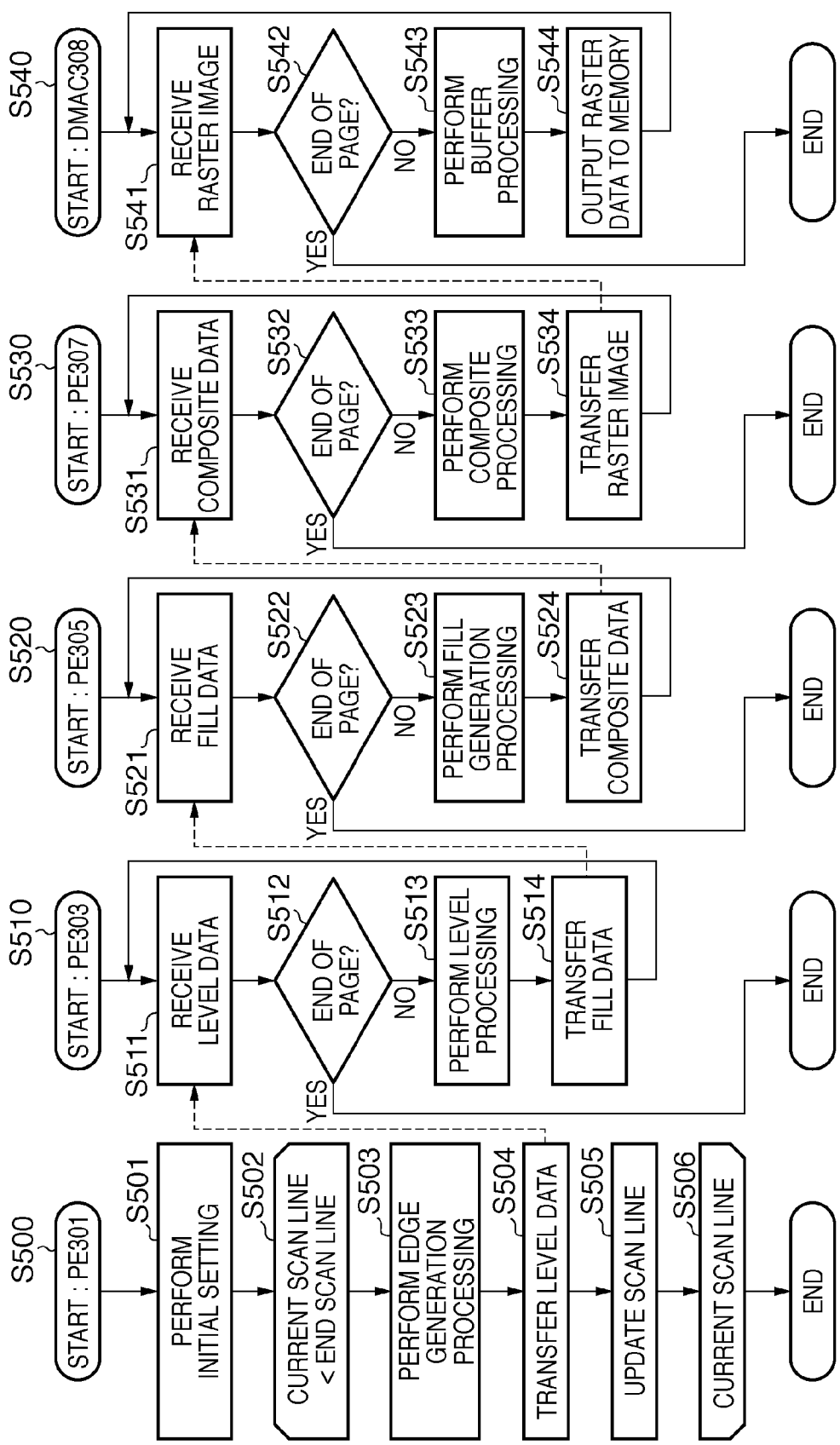

FIG. 6A
PE301-PE303 DATA

| INST | WIDTH | LEVEL_NUM | ADDITIONAL_INFO |

FIG. 6B
PE303-PE305 DATA

| INST | WIDTH | FIL_NUM | ADDITIONAL_INFO |

FIG. 6C
PE305-PE307 DATA

| CMPST_INST | WIDTH | FILL0 | FILL1 | FILL2 | FILL3 |

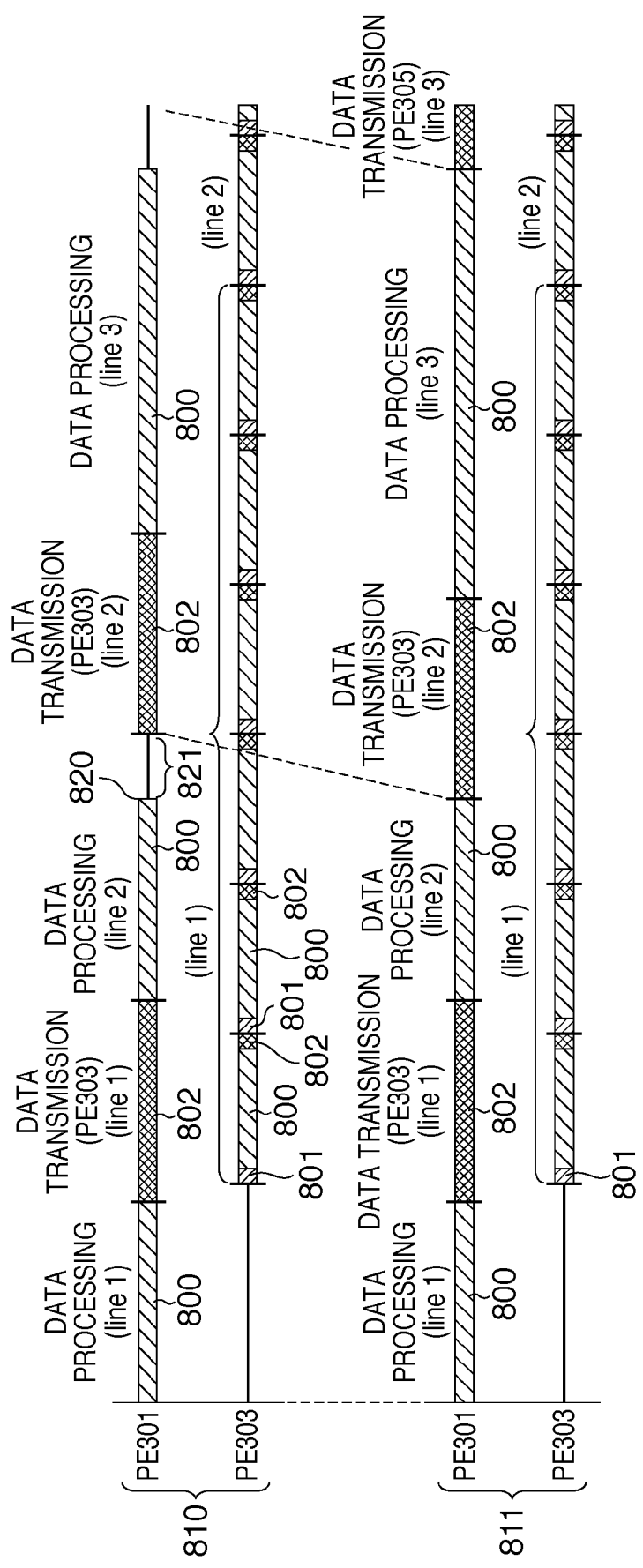

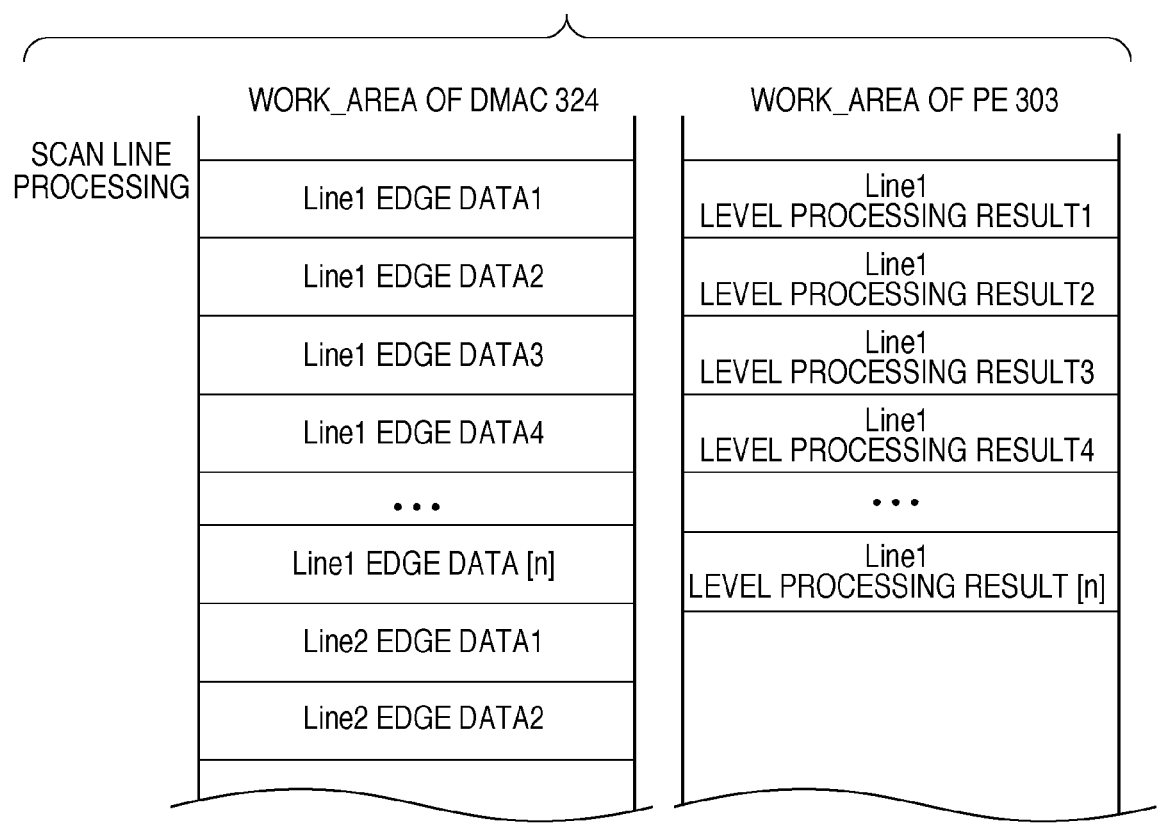

F I G. 11
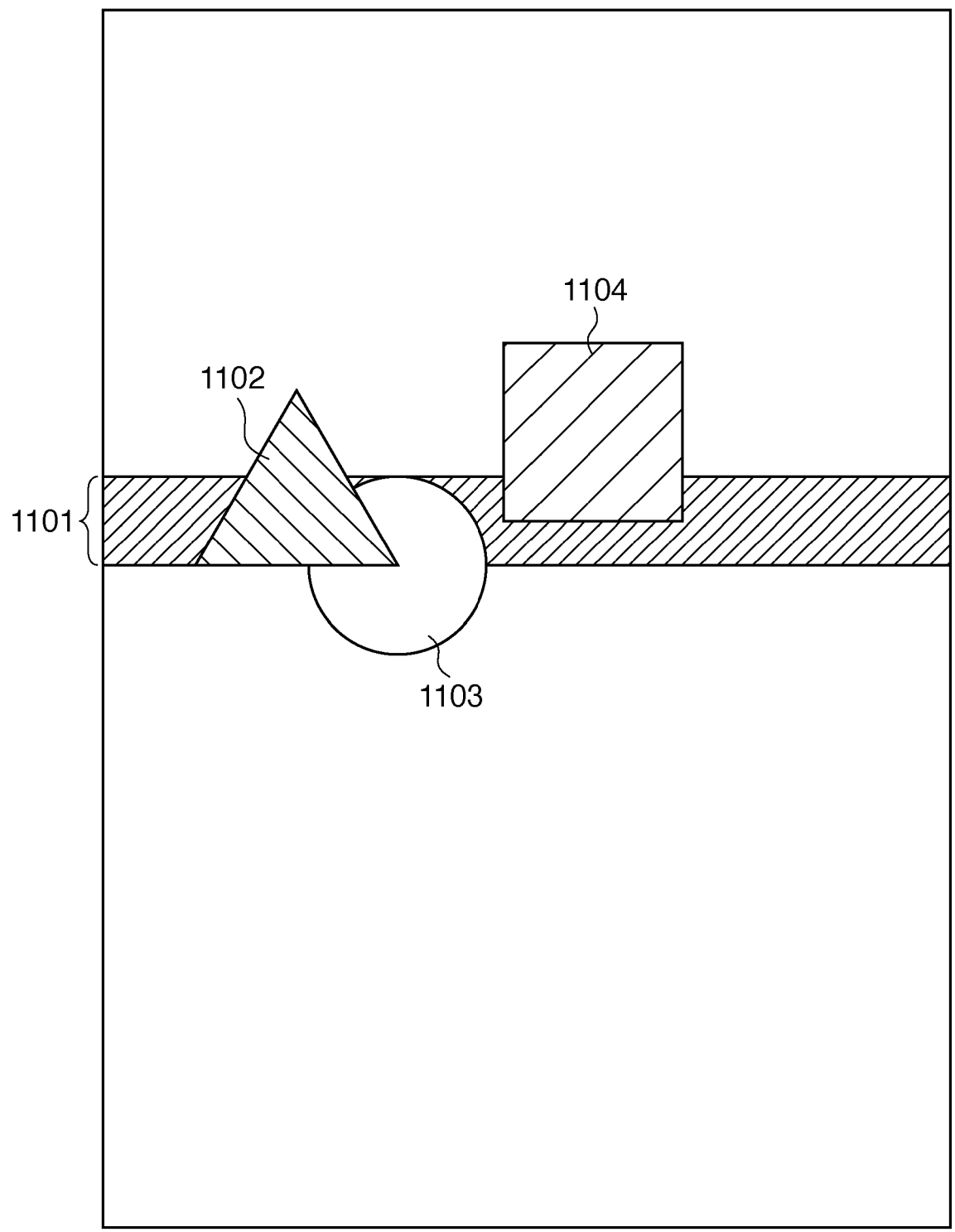

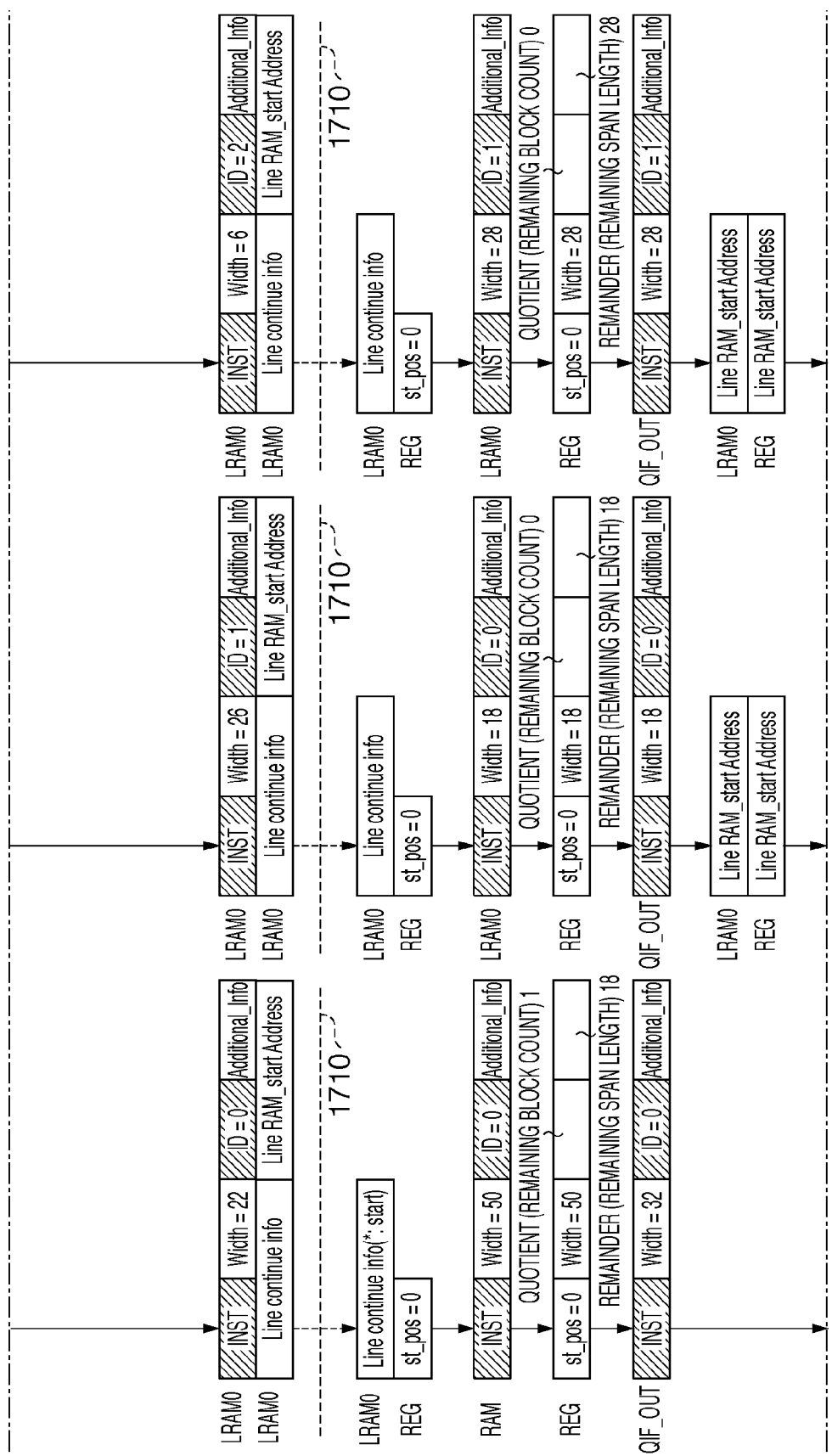

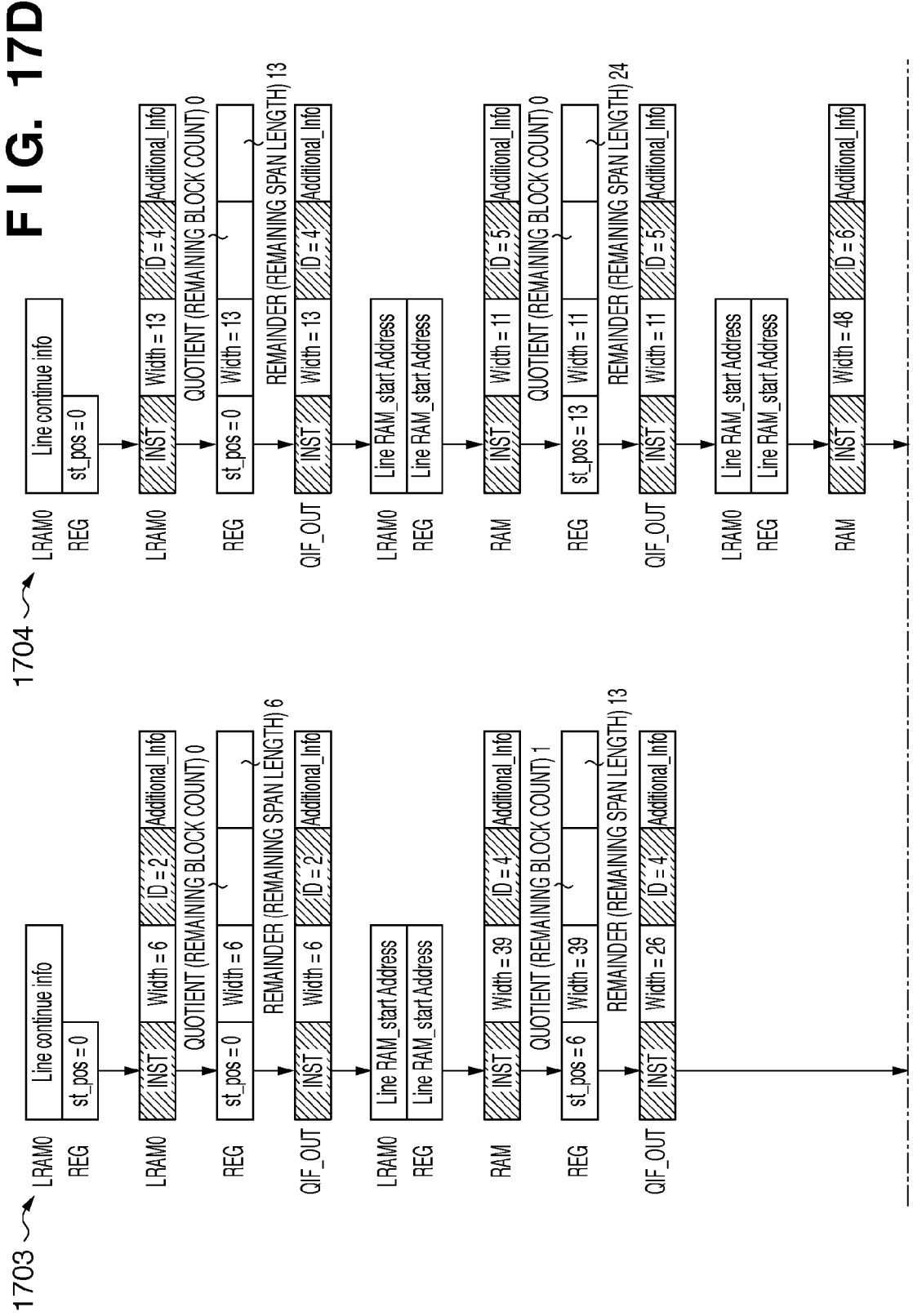

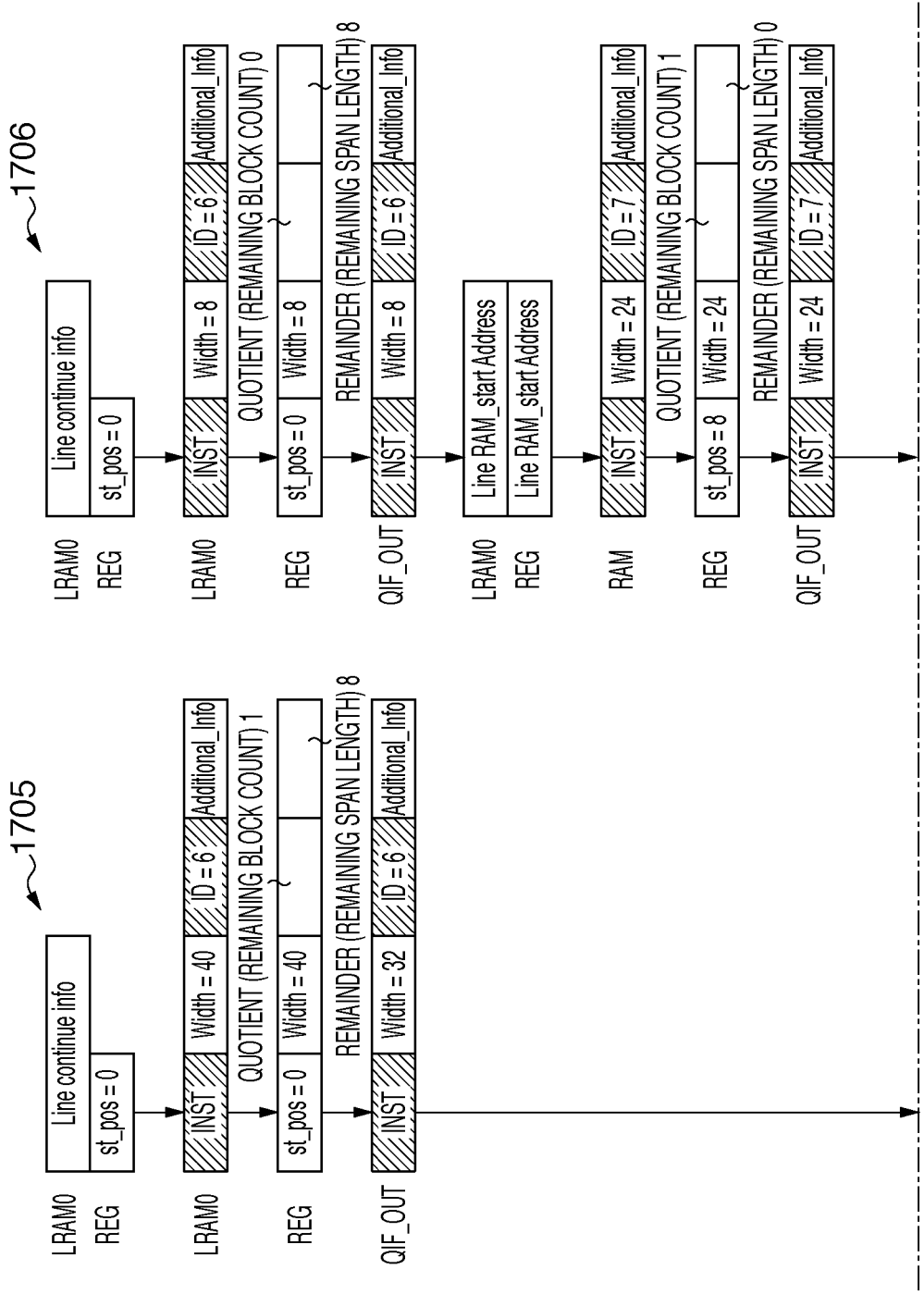

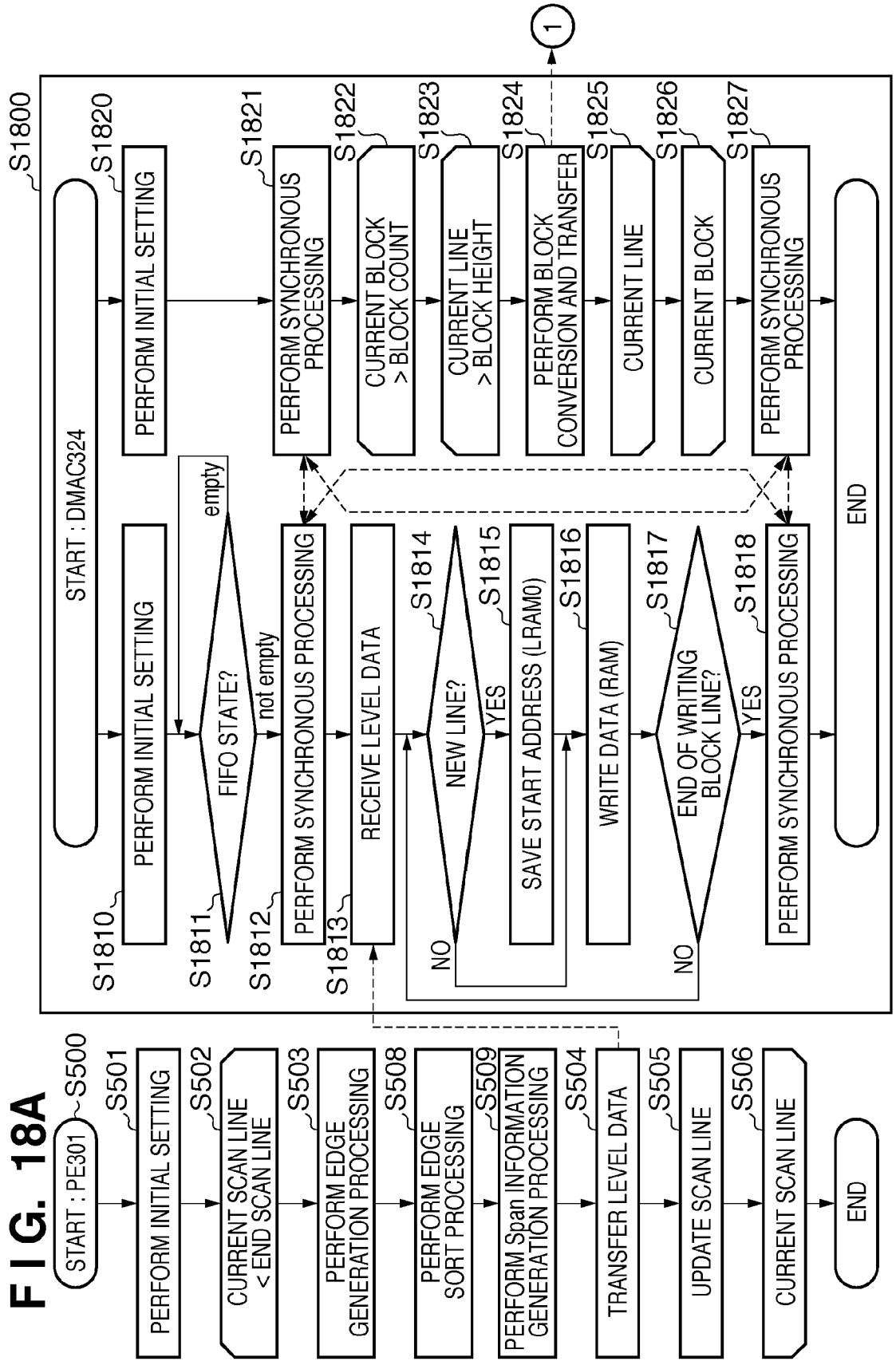

IMAGE PROCESSING APPARATUS FOR OUTPUTTING RASTER IMAGE USING A PLURALITY OF PROCESSORS

BACKGROUND OF THE INVENTION

1. Field of the Invention

The present invention relates to a hardware control technique for processing a raster image formed by an image compression apparatus.

2. Description of the Related Art

Recently, an MFP (Multi-Function Peripheral) which forms an image by an electrophotographic method performs various kinds of handling for image data. For example, the following methods are conceivable as processing for raster image data after rasterizing PDL (Page Description Language) data.

For example, as the first method, raster image data directly undergoes image processing such as color processing, and is output to a printer engine. As the second method, raster image data read out from a memory is developed into a rectangular image, and the rectangular image is encoded and then transferred to another device. As the third method, after raster image data is developed into a rectangular image, the rectangular image undergoes rotation processing without changing the unit of the rectangular image. To perform these processes, the MFP includes a dedicated processor module capable of mutually converting raster image data and tile image data (Japanese Patent Laid-Open No. 2004-157609). The main CPU of the MFP sets an operation mode in a mode information storage unit such as a register in accordance with the sequence of image data processes, implementing various image processes and image data processing sequences.

In Japanese Patent Laid-Open No. 2004-157609, after rendered raster image data is stored once in a DRAM, the image data needs to be divided into rectangles. As the image quality improves, the data transfer amount between the DRAM and the image processing circuit increases, and the processing performance of the MFP may not be achieved. In both the scan line method and painter method generally known as PDL data rendering methods, it is difficult to divide raster image data into rectangles unless at least part of the rendered raster image data is stored in the memory. For example, a large-capacity line buffer is required to divide rendered image data into rectangles without the intervention of the DRAM, failing in rendering processing independent of the printer resolution.

SUMMARY OF THE INVENTION

An aspect of the present invention is to eliminate the above-mentioned problems with the conventional technology.

It is an object of the present invention to provide a technique of outputting rasterized image data of each block without using rendered image data.

According to an aspect of the present invention, there is provided an image processing apparatus having a plurality of processors, for outputting a raster image in a unit of block, comprising: a first processor including a unit that interprets a display list and generates pieces of edge information of objects contained in one line, and a unit that sorts the pieces of edge information for each line, and transfers level data containing link information linking to width information of between the edges of the objects, the pieces of edge information and overlapping information of the objects; a DMA controller including an acquisition unit that acquires information about a pixel count of the block in a main scanning direction and a pixel count of the block in a sub-scanning direction, a management unit that receives the level data transferred from the first processor, and manages a storage location in a memory for the level data at a start of each line in accordance with the pixel count in the sub-scanning direction, a readout control unit that, when the level data corresponding to the pixel count in the sub-scanning direction is stored in the memory, controls a readout order of the level data to read out the level data from the memory, and a transmission unit that transfers the level data read out by the readout control unit to a second processor; and the second processor including a unit that extracts level information serving as the overlapping information of the objects from the level data transferred from the DMA controller, and a unit that sorts an overlapping order of the objects and transfers color information of the objects to a subsequent processor.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5E are flowcharts describing the sequence of rendering processing in the rendering unit;

FIGS. 6A to 6C depict views illustrating examples of the formats of instruction data transferred between processor elements;

FIG. 8 is a timing chart for explaining the function and effect of a FIFO interposed between PEs 301 and 303;

FIGS. 10A and 10B depict views for explaining a processor element which converts edge information into block information;

FIG. 11 depicts a view illustrating an example of a rendering object according to the embodiment;

FIGS. 17A to 17I depict views illustrating an example of transition of data controlled by the read sequencer of the DMAC;

FIGS. 18A and 18B are flowcharts describing overall processing of the rendering unit according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
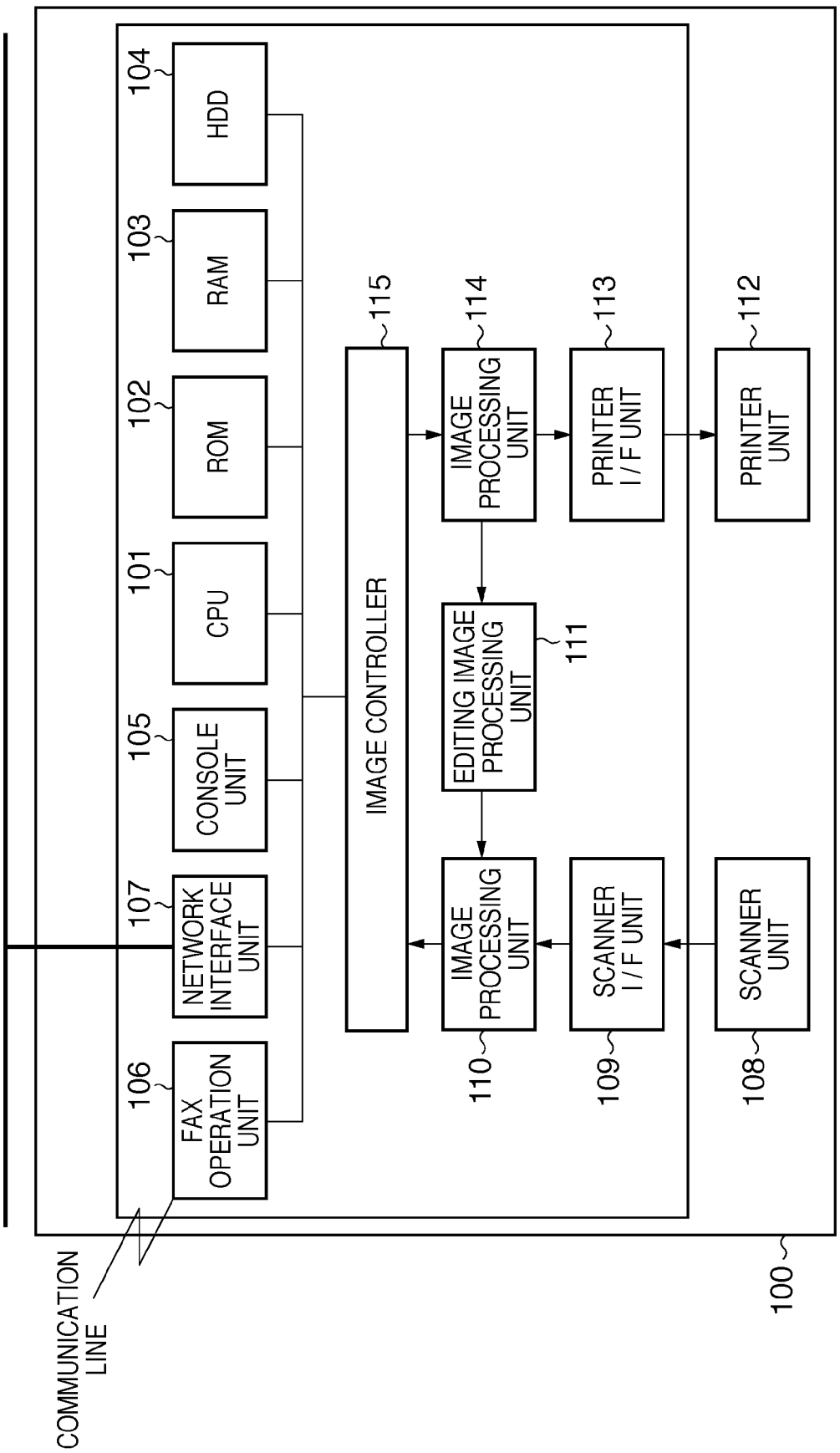
FIG. 1 is a block diagram showing the arrangement of a multi-function peripheral according to an embodiment of the present invention.

FIG. 1 is a block diagram showing the arrangement of a multi-function peripheral (MFP) 100 according to an embodiment of the present invention. The MFP 100 has the functions of the FAX machine, printer, and copying machine, and can process color image data.

A CPU 101 controls all the functions of the MFP 100 including image input/output apparatuses such as a scanner unit 108 and printer unit 112, image processing units, and communication function units. A ROM 102 stores programs to be executed by the CPU 101, and the like. A RAM 103 stores programs to be executed by the CPU 101, and when executing processing of a program, is used as a work area and stores image data and the like. An HDD (Hard Disk Drive) 104 temporarily saves software programs to be executed by the CPU 101, image data to be transferred from another device (not shown) or to be transferred to another device, PDL data, scan data, and pre-print data. A console unit 105 displays the status and setting information of the MFP 100 to the user, and transfers an operation instruction from the user to the CPU 101. A program to be executed by the CPU 101 is installed in the HDD 104, and loaded into the RAM 103 in accordance with a boot program stored in the ROM 102.

An image controller 115 has a function of controlling to transfer data in the MFP 100 to an optimum location. A FAX operation unit 106 can store, in the HDD 104, a facsimile image received via a communication line, transfer it to another device via a network interface unit 107, or print it. The scanner unit 108 scans a document image to generate image data. The scanner unit 108 includes a lens for condensing light reflected by a document, a CCD sensor which receives the light and converts it into an electrical signal, an analog signal processor, and an A/D converter (none are shown). The scanner unit 108 supplies generated image data to an image processing unit 110 via a scanner I/F (interface) unit 109. The image processing unit 110 performs various processes such as spatial filtering and color space conversion for the image data from the scanner. An editing image processing unit 111 includes a plurality of IP (Image Process) functional units for performing various kinds of image processes such as color space conversion, resolution conversion, binarization, and rotation.

The printer unit 112 is a printer apparatus such as a laser beam printer or LED printer. When the printer unit 112 is a laser beam printer, it includes an exposure control unit having a semiconductor laser, an image forming unit, and a transfer paper conveyance control unit (none are shown). An image processing unit 114 executes printer image processes such as image region processing and smoothing for image data input via the image controller 115. Also, the image processing unit 114 creates page image data from image data, and outputs it to the printer unit 112 via a printer I/F unit 113. The printer I/F unit 113 outputs print data in synchronization with the timing requested by the printer unit 112. For the copy function, the printer unit 112 forms an image on a print medium based on image data output from the scanner unit 108.

Figure 2:
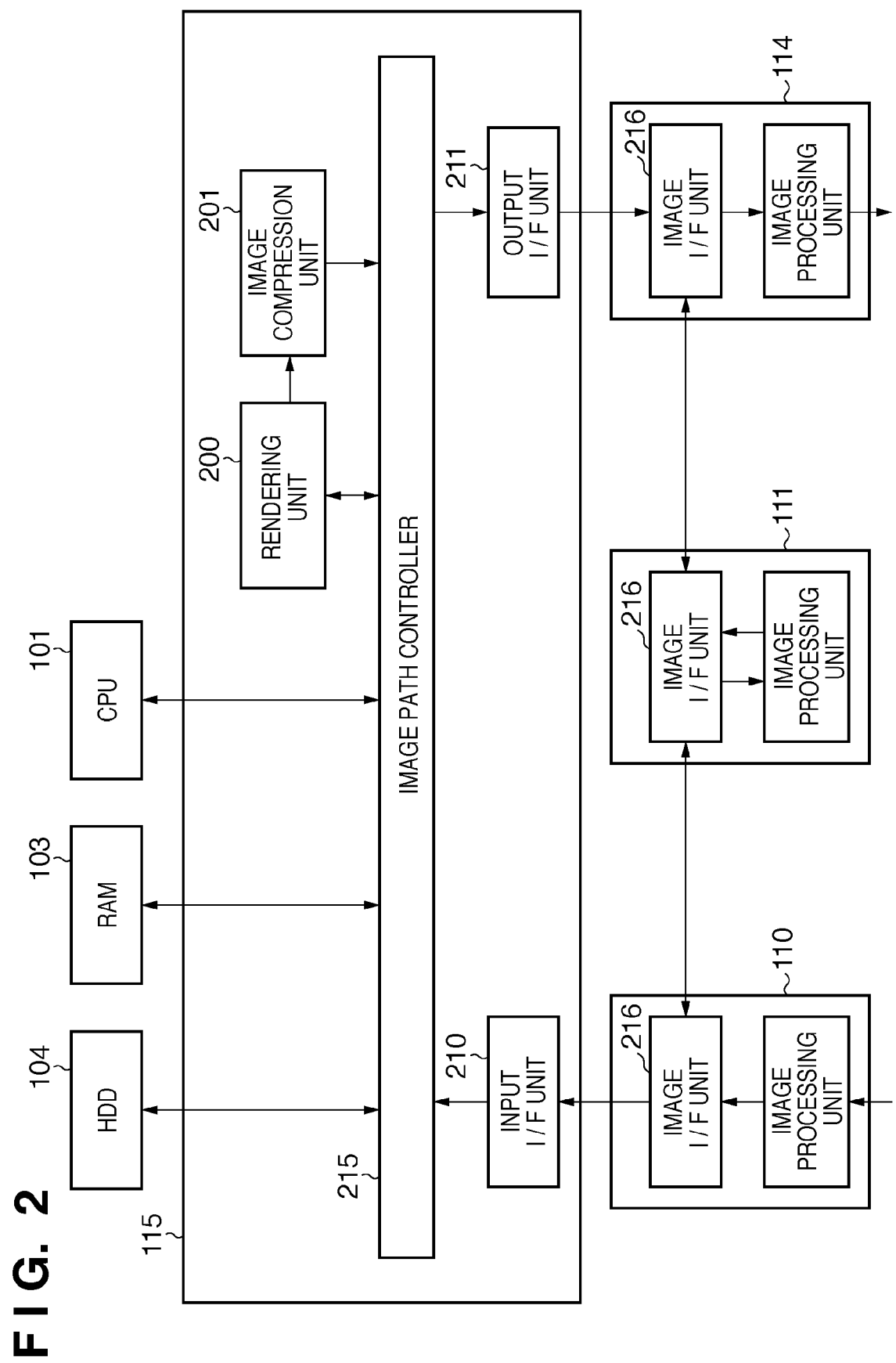
FIG. 2 is a block diagram for explaining details of the image controller of the multi-function peripheral.

FIG. 2 is a block diagram for explaining details of the image controller 115. An encoding circuit for compressing a PDL print image will be exemplified. Note that the image processing unit 110 for the scanner may incorporate this encoding circuit. In FIG. 2, the same reference numerals as those in FIG. 1 denote the same parts.

An image path controller 215 determines the destinations of data transferred not only from the CPU 101, RAM 103, and HDD 104, but also from the internal blocks of the image controller 115, the scanner unit 108, and the printer unit 112. PDL printing will be exemplified.

When the CPU 101 receives, via the network interface unit 107, PDL data developed by a host computer, the CPU 101 stores the PDL data in the HDD 104. Then, the CPU 101 develops the PDL data into a display list serving as an intermediate language for rasterization by a rendering unit 200, and stores the display list in the RAM 103. After developing the display list in the RAM 103, the CPU 101 instructs the rendering unit 200 to start rendering. In response to this, the rendering unit 200 interprets the display list and develops it into a raster image. Upon completion of development into raster image data, the rendering unit 200 transfers the raster image data to an image compression unit 201. The image compression unit 201 encodes the raster image data, and stores the encoded image in the HDD 104 or RAM 103. Also, the image compression unit 201 supplies the encoded image to an image I/F (interface) unit 216 via an output I/F unit 211. The image compression unit 201 transfers the encoded image to the editing image processing unit 111, and the editing image processing unit 111 performs image processes such as color space conversion, resolution conversion, binarization, and rotation. The processed image can also be returned to the image path controller 215 via the image processing unit 110 and an input I/F unit 210, and developed again in the RAM 103 or HDD 104.

Figure 3:
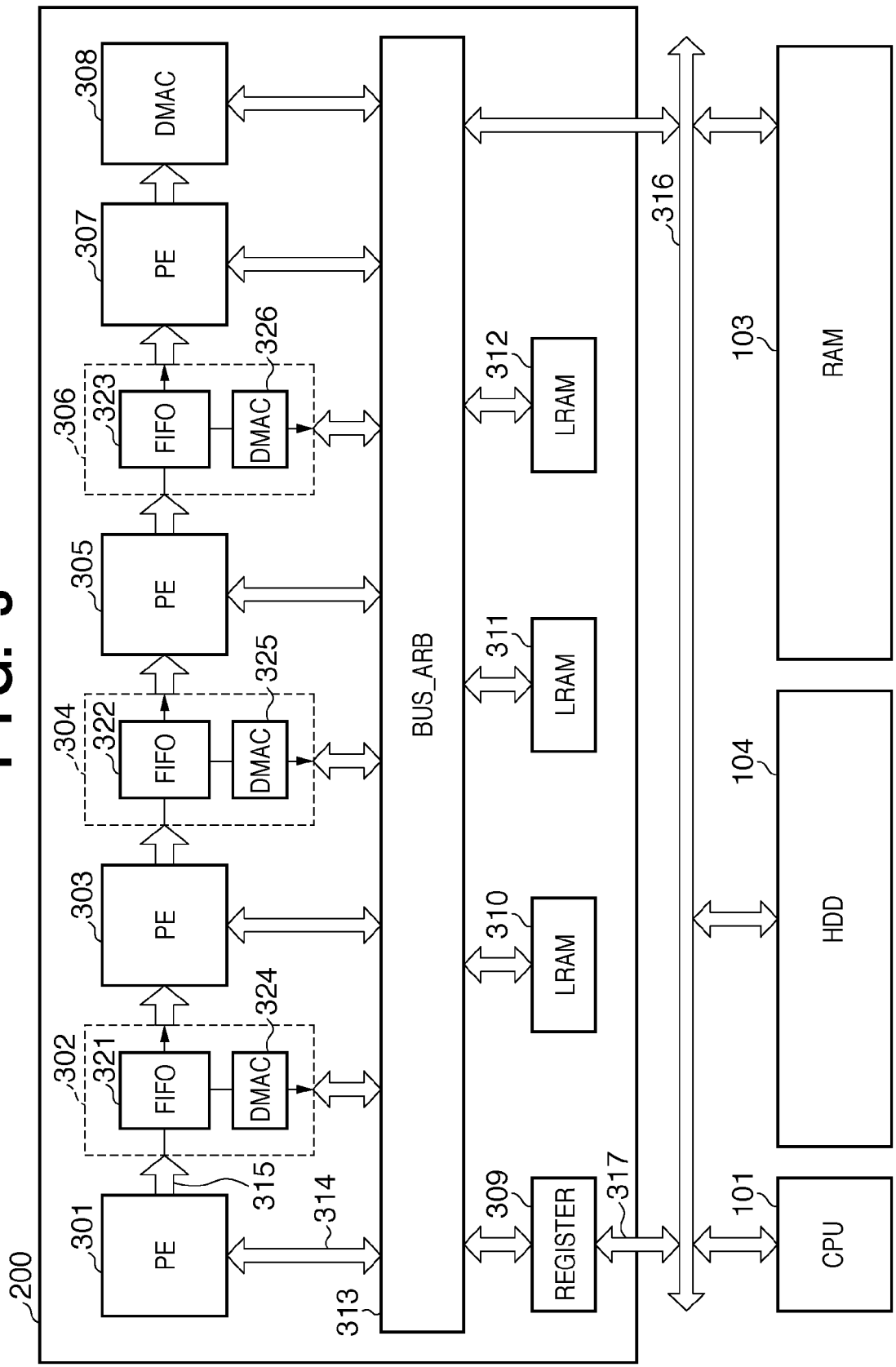
FIG. 3 is a block diagram for explaining the arrangement of the rendering unit of the multi-function peripheral.

FIG. 3 is a block diagram for explaining the arrangement of the rendering unit 200. FIG. 3 shows the connection relationship between the CPU 101, the HDD 104, and the RAM 103. The rendering unit 200 includes processor elements (PEs) 301, 303, 305, and 307, local memories (LRAMs) 310, 311, and 312, a DMAC (DMA controller) 308, FIFOs 302, 304, and 306, and a register 309. The rendering unit 200 is connected to the CPU 101, HDD 104, and RAM 103 via a system bus 316. Information such as the operation mode can be set in the register 309 of the rendering unit 200 from the system bus 316 via a register interface 317. Two types of buses exist in the rendering unit 200. One is a PE bus 315 which connects a rendering bus 314 connected to a BUS_ARB 313, and the processor elements. The PE bus 315 is a unidirectional bus, and for example, transfers data from the PE 301 (first processor) to the PE 303 (second processor) via the inter-processor FIFO 302. The inter-processor FIFO 302 includes a FIFO 321 and DMAC 324. Since the inter-processor FIFO 302 is made up of the FIFO 321 and DMAC 324, data can be saved in the local memory (LRAM) 310, 311, or 312 or the RAM 103 via the BUS_ARB 313. This effect will be described later. Note that the inter-processor FIFOs 304 and 306 also have the same arrangement as that of the inter-processor FIFO 302. In FIG. 3, the respective inter-processor FIFOs include the FIFO 321, a FIFO 322, and a FIFO 323, and the DMAC 324, a DMAC 325, and a DMAC 326, respectively, but may be formed from only FIFOs.

Figure 4:
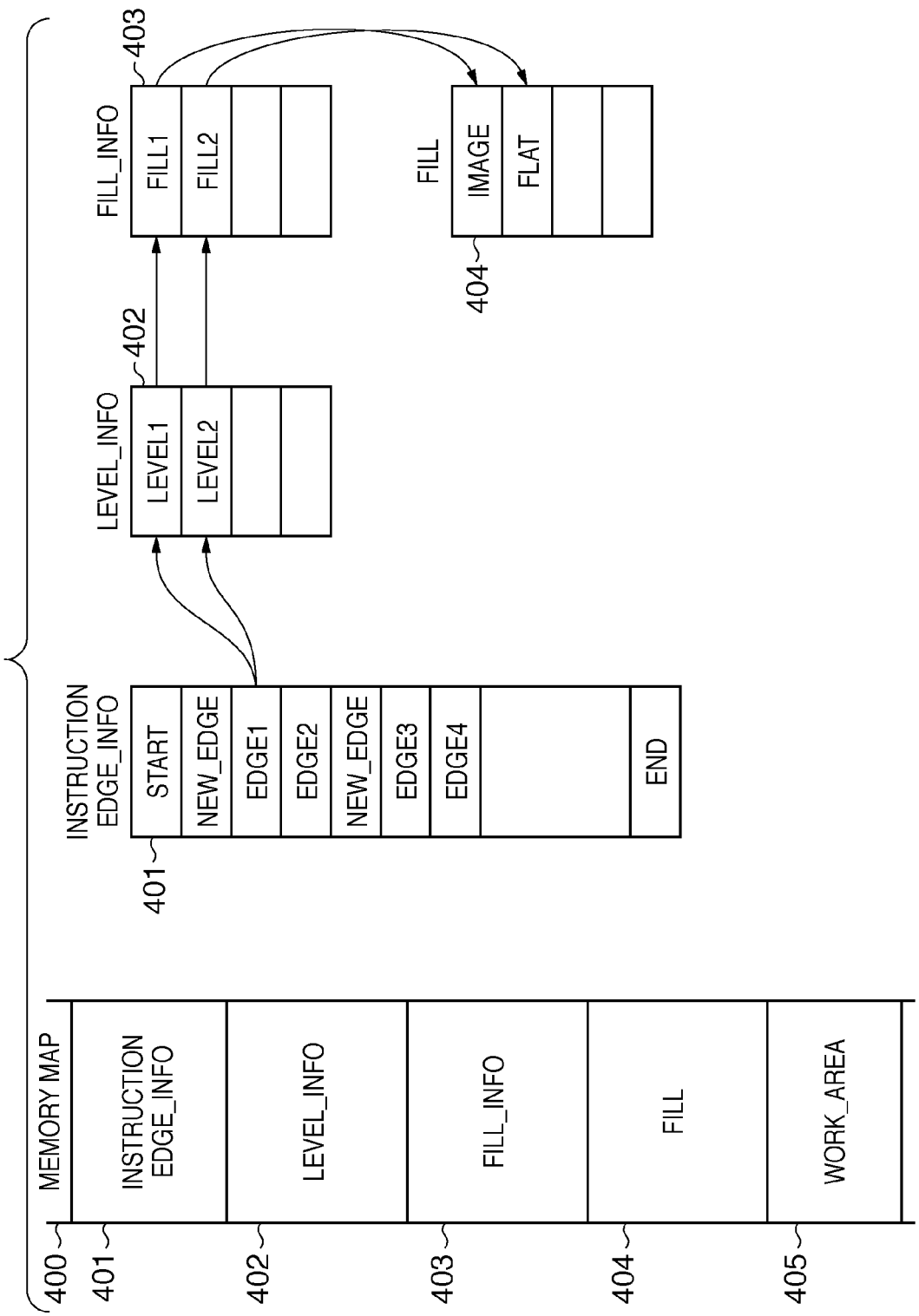
FIG. 4 depicts a view illustrating an example of a display list for performing rendering by the rendering unit.

FIG. 4 depicts a view for explaining a display list for performing rendering by the rendering unit 200 according to the embodiment.

As represented by a memory map 400, the display list includes INSTRUCTION EDGE_INFO 401, LEVEL_INFO 402, FILL_INFO 403, FILL 404, and WORK_AREA 405. The EDGE_INFO 401 is information indicating a color change point on a given line. The LEVEL_INFO 402 is information indicating the rendering order of overlapping pieces of color information at a given position. The FILL_INFO 403 indicates color information and overlapping. The FILL 404 is image information itself such as a photograph. The WORK_AREA 405 is an area for storing information which is temporarily required in rendering processing. As shown in FIG. 4, the respective element data of the display list have a link structure between pieces of information. Thus, the rendering unit 200 can be divided into a plurality of processor elements to dedicate them to processes of respective pieces of information EDGE, LEVEL, and FILL.

FIGS. 5A to 5E are flowcharts describing the sequence of rendering processing in the rendering unit 200 according to the embodiment. The processor elements (PEs) operate in a pipeline manner. Dotted lines in FIGS. 5A to 5E indicate data transfer and cooperative relationships.

S500 expresses a flowchart describing processing of the PE 301. The PE 301 performs initial setting in step S501, and then repeats processes (steps S502 to S506) until a line to be rendered (scan line) exceeds the rendering region. In step S503, the PE 301 acquires information indicating a color change point from the INSTRUCTION EDGE_INFO 401 of the display list, and generates edge information. In step S504, the PE 301 transfers level information associated with the edge information as "level data" to the PE 303. In step S505, the PE 301 updates the scan line.

S510 expresses a flowchart describing processing of the PE 303. In step S511, the PE 303 receives the level data from the PE 301. In step S512, the PE 303 determines whether or not the page ends. If the page ends, the PE 303 ends the process. If the page does not end, the process of the PE 303 advances to step S513 to acquire overlapping information of objects to be rendered, and change the overlapping order. The process advances to step S514 to transfer, to the PE 305 (third processor), fill data serving as color information to be rendered.

S520 expresses a flowchart describing processing of the PE 305. In step S521, the PE 305 receives the fill data from the PE 303. In step S522, the PE 305 determines whether or not the page ends. If the page ends, the PE 305 ends the process. If the page does not end, the process of the PE 305 advances to step S523 to acquire color information to be rendered by the object overlapping amount, and fill the object. Then, the process advances to step S524 to transfer, to the subsequent PE 307 (fourth processor), composite data indicating overlapping processing procedures.

S530 expresses a flowchart describing processing of the PE 307. In step S531, the PE 307 receives the composite data from the PE 305. In step S532, the PE 307 determines whether or not the page ends. If the page ends, the PE 307 ends the process. If the page does not end, the process of the PE 307 advances to step S533 to perform object overlapping processing based on composite data of color information of each object to be rendered. In step S534, the PE 307 transfers the finally obtained raster image data to the DMAC 308.

S540 expresses a flowchart describing processing of the DMAC 308. In step S541, the DMAC 308 receives the raster image data from the PE 307. The process of the DMAC 308 advances to step S542 to determine whether or not the page ends. If the page ends, the DMAC 308 ends the process. If the page does not end, the process advances to step S543 to store the raster data in the buffer. After the data is stored in the buffer, the process advances to step S544 to output the raster data to a RAM space, which is designated in advance.

FIGS. 6A to 6C depict views illustrating example of the formats of instruction data transferred between the processor elements.

FIG. 6A shows the format of instruction data transferred from the PE 301 to the PE 303. This instruction data format includes an instruction type INST, width information WIDTH between edges, a level number LEVEL_NUM associated with the edge, and other information ADDITIONAL_INFO.

FIG. 6B shows the format of instruction data transferred from the PE 303 to the PE 305. This instruction data format includes an instruction type INST, width information WIDTH between edges, a fill number FIL_NUM regarding the edge, and other information ADDITIONAL_INFO.

FIG. 6C shows the format of instruction data transferred from the PE 305 to the PE 307. This instruction data format includes a composite instruction type COMPST_INST, width information WIDTH between edges, and pieces of overlapping color information FILL0 to FILL3. The instruction type is information for changing processing contents, such as page start, line start, or page end.

Figure 7:
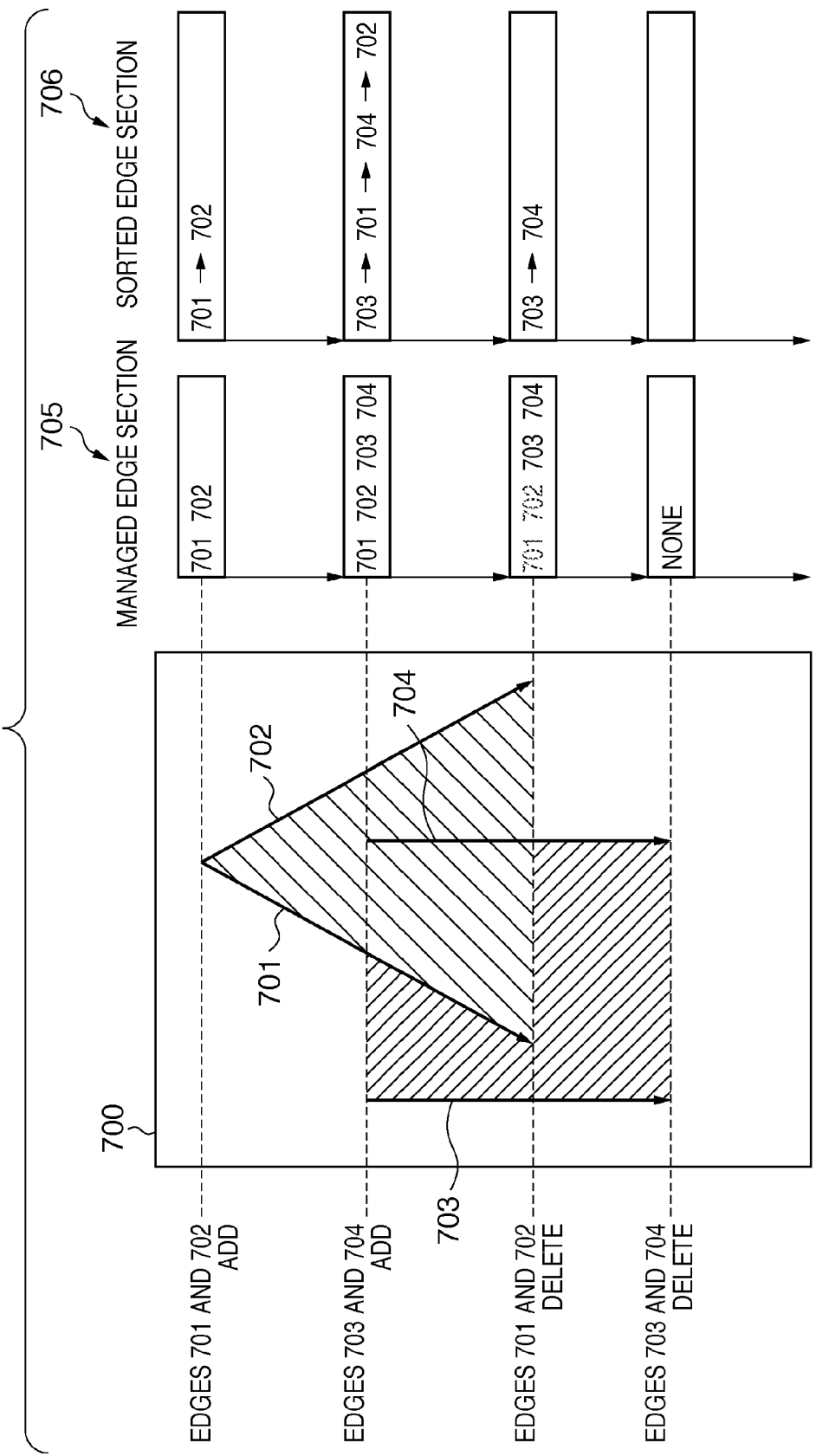
FIG. 7 depicts a view for explaining the processing contents of the PE.

FIG. 7 depicts a view illustrating an example of the concrete processing contents of the PE 301.

A triangle, and a quadrangle exist in a rendering region 700. Also, FIG. 7 shows a managed edge section 705 which manages edge numbers managed by the PE 301, and a sorted edge section 706 which stores edge information obtained by sorting the edge positions in the scanning direction. Each edge is indicated by vector information which couples start and end points, like edges 701 to 704 in FIG. 7.

Scanning starts from the top line of the rendering region 700. When the line to be rendered reaches the positions of the edges 701 and 702, the PE 301 reads out the positions of the edges 701 and 702 from the EDGE_INFO 401 of the display list, and stores them in the managed edge section 705. Then, the PE 301 stores, in the sorted edge section 706, pieces of edge information obtained by rearranging pieces of edge information of the edges 701 and 702 in the scanning direction. As a result, the edges 701 and 702 are sorted and stored in the order named in the sorted edge section 706.

When the scan line reaches the line of the edges 703 and 704, the PE 301 additionally stores edge information of the quadrangle in the managed edge section 705, and stores the sorting result in the sorted edge section 706. In this case, four edges are detected per line, and the sorting order is the order of the edges 703, 701, 704, and 702 in the scanning order.

When the scan line reaches a line which runs off the edges 701 and 702 of the triangle, the PE 301 deletes the pieces of edge information of the edges 701 and 702 from the managed edge section 705, and stores only the pieces of edge information of the remaining edges 703 and 704 in the sorted edge section 706 after sorting. When the scan line runs off the edges 703 and 704, the PE 301 deletes the remaining pieces of edge information from the managed edge section 705 and sorted edge section 706, and issues only an instruction to the PE 303 and subsequent processor elements to render white (or background color).

FIG. 8 is a timing chart for explaining the function and effect of the FIFO 302 interposed between the PEs 301 and 303. FIG. 8 is a timing chart showing the processing time relationship between the PEs 301 and 303. Referring to FIG. 8, each upward-sloping lines section 800 indicates the time period of data processing by each processor element. Each mesh section 802 indicates data transmission to the inter-processor FIFO 302. Each downward-sloping lines section 801 indicates the processing time of data reception from a preceding processor element.

A timing chart 810 shows a case in which the inter-processor FIFO 302 is formed from only the FIFO 321. A timing chart 811 shows a case in which the inter-processor FIFO 302 is formed from the FIFO 321 and DMAC 324, as shown in FIG. 3.

The timing chart 810 assumes the following situation. More specifically, the PE 301 has acquired edge information of one line from the display list, and has transferred data to the PE 303 after sorting. FIG. 8 shows a case in which the FIFO 321 of the FIFO 302 can store four level data. At this time, the PE 301 completes data processing of line 2 at 820. At this time, however, the PE 303 still processes the third level information of line 1. Thus, the FIFO 321 becomes full, and no data can be transferred from the PE 301 to the PE 303.

To the contrary, in the timing chart 811, the DMAC 324 is arranged in the inter-processor FIFO 302, so data transferred from the PE 301 can be stored in the large-capacity local memory (LRAM) or the RAM 103. In the timing chart 811, therefore, the time interval between data processed between processor elements and one data to be transferred, like a time interval 821, can be eliminated. Since the amount of data which can be saved in the local memory or the like is variable, this configuration is optimum for the rendering unit 200 in which the data amount varies depending on data to be rendered.

A case in which the image compression unit 201 encodes and compresses an image output from the rendering unit 200 will be examined. As image encoding for a rendered multi-level raster image, most methods encode a block, as typified by JPEG. In this case, pixel data which is output from the rendering unit 200 and aligned in the raster order is stored in the line buffer. As the pixel count of the image encoding block and the resolution increase, the system cost rises. To prevent this, a method of generating a raster image in the order of blocks based on the display list for scan line output will be explained.

Figure 9B:
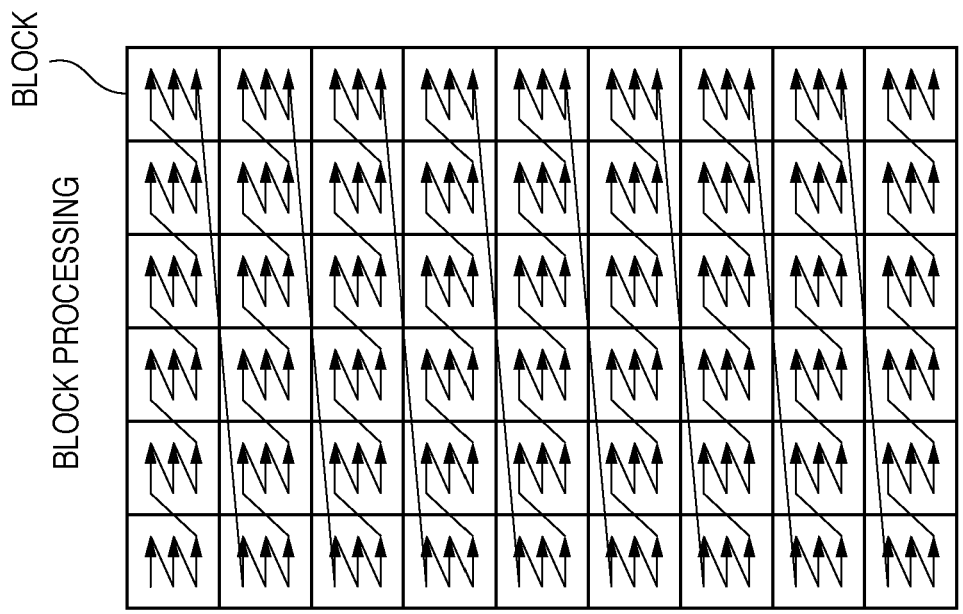
FIGS. 9A and 9B depict views for explaining two raster image generation methods compliant with the display list.
Figure 9A:
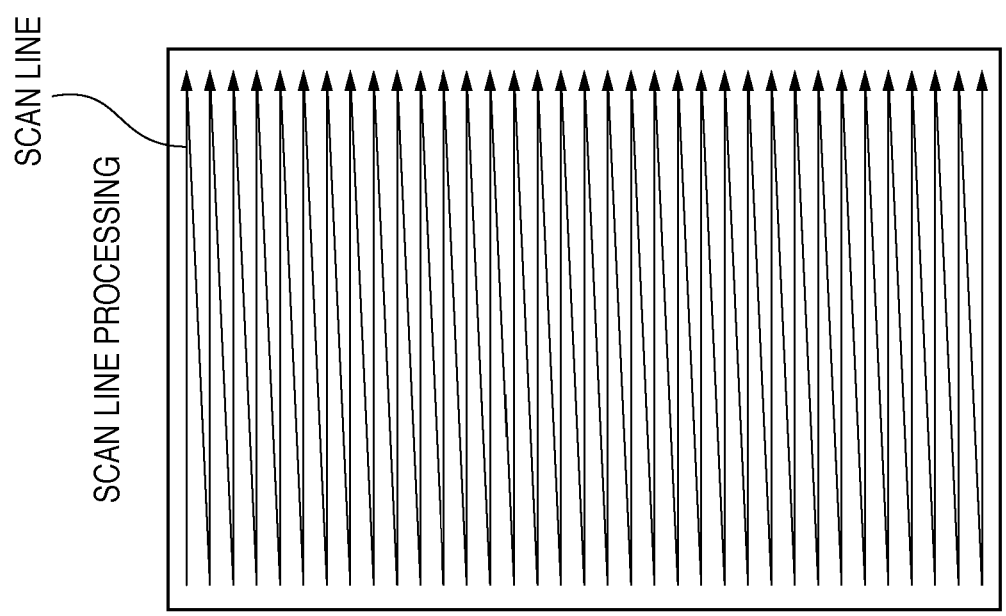

FIGS. 9A and 9B depict views illustrating an example of two raster image generation methods compliant with the display list for output in the scan line order.

FIG. 9A shows an order in which a raster image is generated in the scan line order. FIG. 9B shows an order in which a raster image is generated in the block order. To perform rendering processing in the block order, edge information of each line generated from the display list needs to be converted into block information. When generating a raster image in the block order from the above-mentioned display list for output in the scan line order, a processor element which converts edge information into block information is important.

Figure 10B:
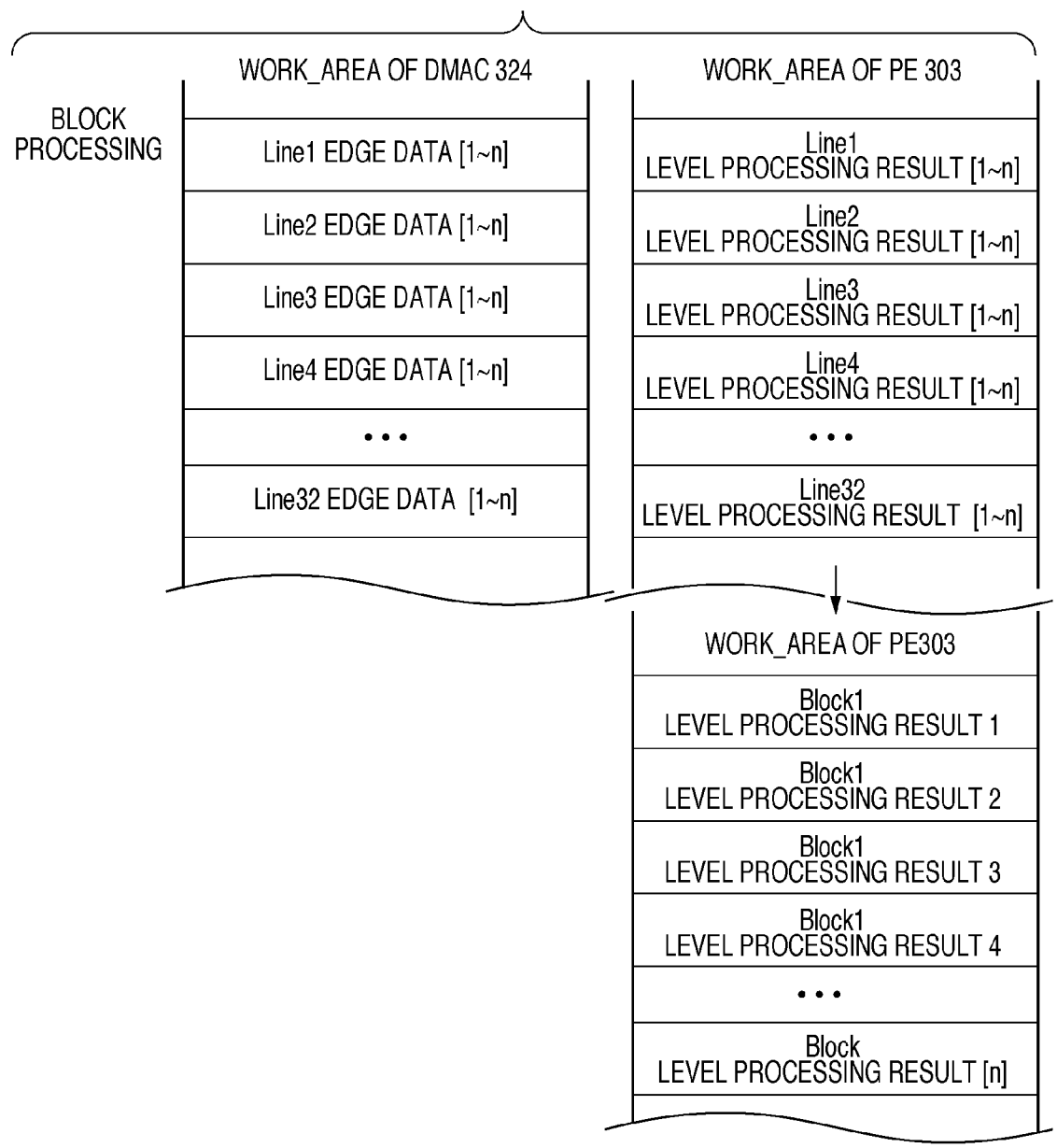

FIGS. 10A and 10B depict views for explaining a processor element optimum for converting edge information into block information. FIGS. 10A and 10B depict views showing the state of the WORK_AREA 405 managed by the DMAC 324 of the FIFO 302 and that of the WORK_AREA 405 managed by the PE 303 when rendering is done according the respective methods in FIGS. 9A and 9B.

As shown in FIG. 10A, the DMAC 324 stores, in the WORK_AREA 405, the number of edge data corresponding to a preset buffer capacity. The PE 303 stores, in the WORK_AREA 405, the result of sorting the overlapping order of level data received from the DMAC 324. At this time, by holding a maximum of the sorting results of one line, sorting processing can be omitted when the same level information different in only the width between edges is received from the PE 301.

FIG. 10B shows the use status of the WORK_AREA 405 by the PE 303 when the PE 303 performs block information conversion (upper stage), and that of the WORK_AREA 405 by the PE 303 when the DMAC 324 performs block information conversion (lower stage). The DMAC 324 stores, in the WORK_AREA 405, edge data by the pixel count (32 lines in FIG. 10B) of a block in the sub-scanning direction regardless of a block to undergo block information conversion processing. However, when the PE 303 executes block information conversion processing, even the PE 303 stores the level processing results of 32 lines in the WORK_AREA 405. Alternatively, no level information may be held. As long as the DMAC 324 can perform block information conversion processing, the PE 303 suffices to hold only the level processing result of each block. This means that, if the DMAC 324 executes block information conversion processing, the system memory can be greatly reduced. Further, by performing block information conversion processing by the DMAC 324, the two rendering methods can be coped with by switching only the operation mode of the DMAC 324 without changing the processing contents of the PEs 301 and 303.

Block information conversion processing using the FIFO 302 having the DMAC 324 will be explained with reference to FIG. 11 to FIGS. 19A to 19C.

FIG. 11 shows an example of a rendering region. In FIG. 11, there are three, triangle, circle, and quadrangle objects 1102, 1103, and 1104. Processing for 32 lines (block lines) of a hatched region 1101 will be explained with reference to FIGS. 12A to 14.

Figure 12A:
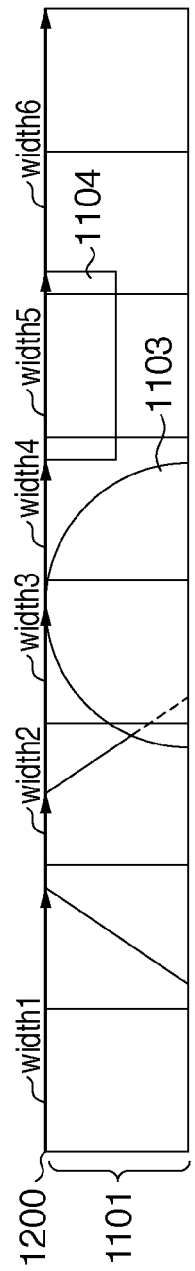
FIGS. 12A to 12F depict views showing edge information when the region in FIG. 11 is extracted in accordance with the scan line position.

FIGS. 12A to 12F show edge information when the region 1101 in FIG. 11 is extracted in accordance with the position of a scan line 1200. FIG. 12A shows edge information when the scan line 1200 is positioned at the top of the region 1101. In FIGS. 12A to 12F, the width between edges is defined as width[i]. Since the top of the object 1103 (semicircle) contacts the top line, there is no edge of the object 1103.

Figure 12B:
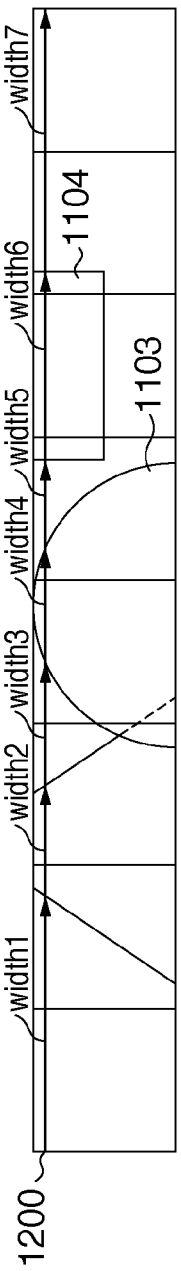
Figure 12C:
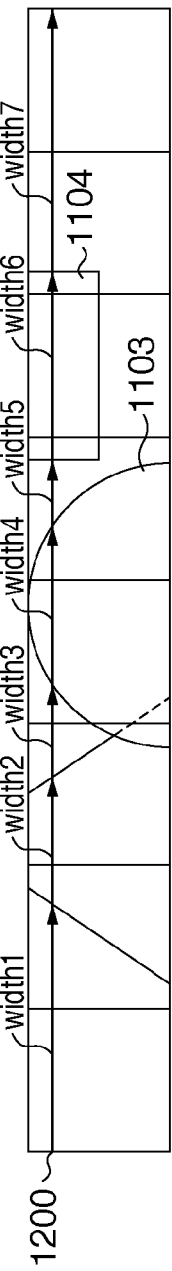
Figure 12D:
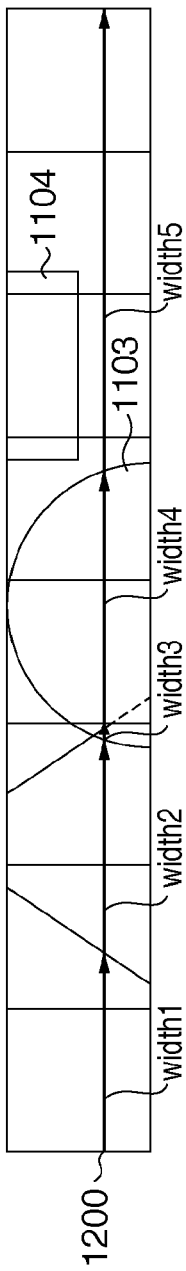
Figure 12E:
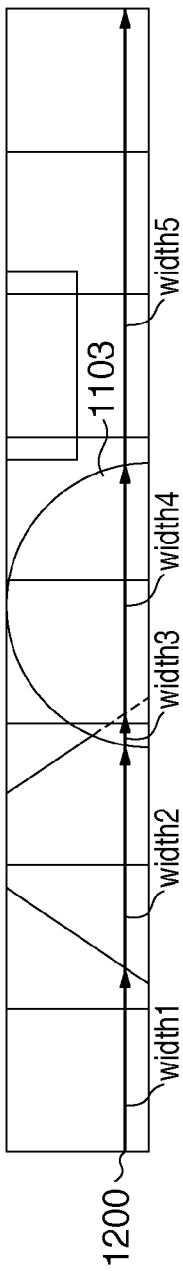
Figure 12F:
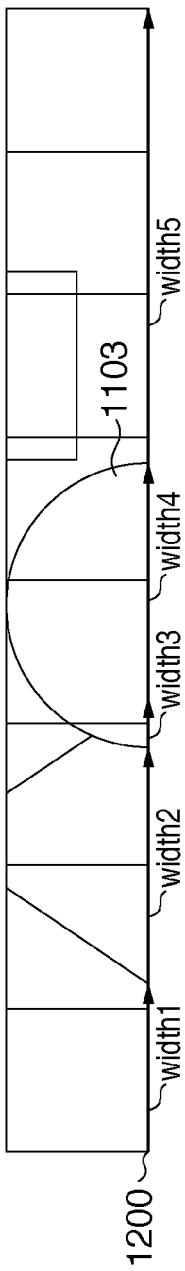

FIG. 12B shows edge information when the scan line 1200 reaches a line slightly lower than the top line. The number of edges does not change between FIGS. 12B and 12C, and the width between edges changes. In FIGS. 12D and 12E, the scan line 1200 runs off the quadrangle object 1104, so width6 and width7 disappear. FIG. 12F shows edge information when the scan line 1200 reaches the bottom of the region 1101. The PE 301 generates each width information from edge information, and transfers, as the level data in FIG. 6A to the DMAC 324 and PE 303, the width and link information to level information serving as overlapping information.

Figure 13:
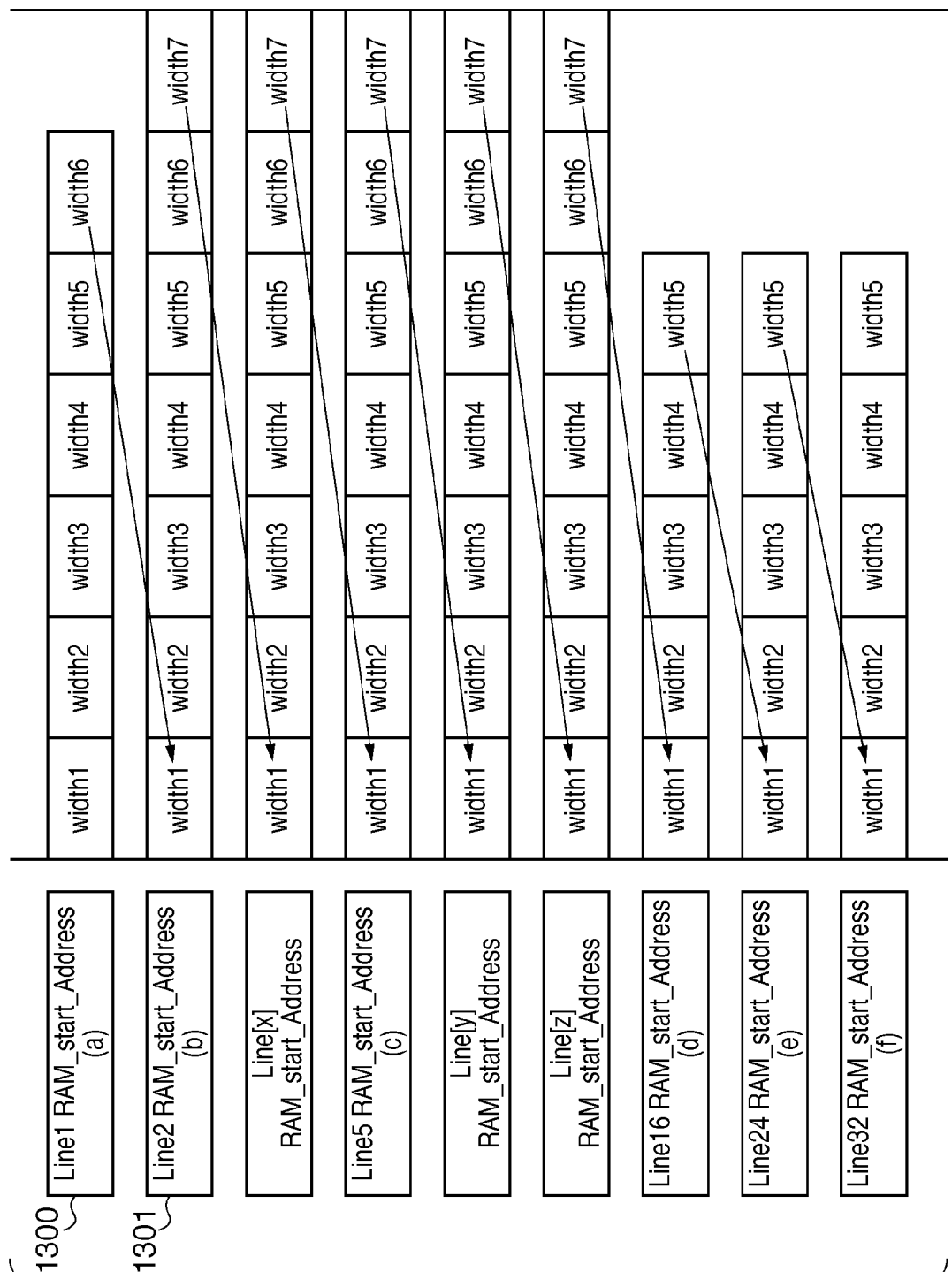
FIG. 13 depicts a view showing a memory state managed by the write sequencer of a DMAC 324.
Figure 14:
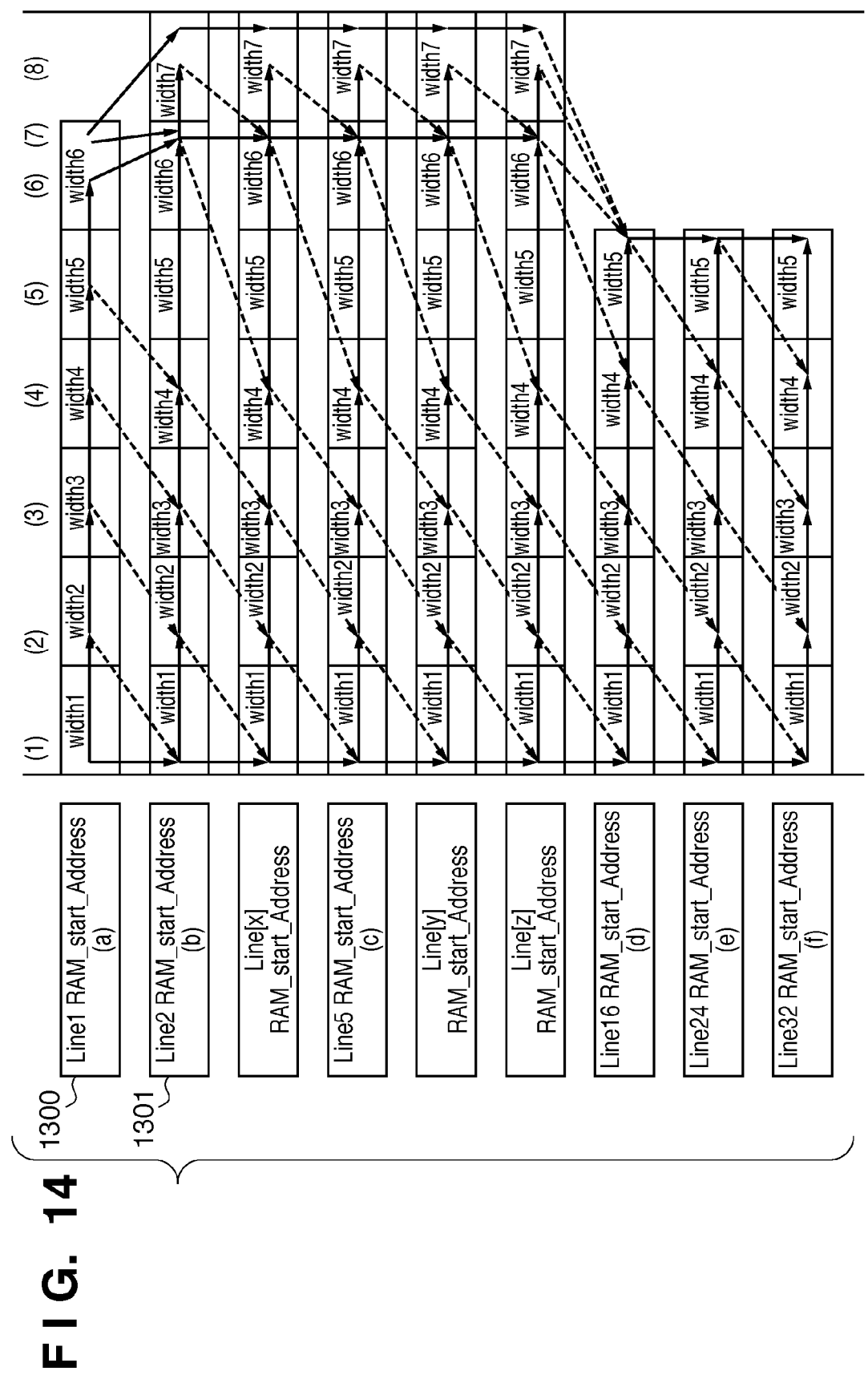
FIG. 14 depicts a view showing a memory state managed by the read sequencer of the DMAC 324.

FIGS. 13 and 14 depict views for explaining an outline of the memory state and read/write order managed by the DMAC 324. In FIGS. 13 and 14, alphabetical letters (a) to (f) suffixed to the start addresses of respective lines on the left side correspond to FIGS. 12A to 12F.

FIG. 13 shows memory information of block lines stored in the WORK_AREA 405 by the DMAC 324. In 1300, the DMAC 324 writes the start address of Line1 in an address storage location RAM_start_Address, and then writes sixth pieces of level information width in the memory. When the PE 301 notifies the DMAC 324 that a new line has started, the DMAC 324 writes the start address of Line2 in RAM_start_Address in 1301, and stores seven pieces of level information in the memory. The DMAC 324 writes the start address and level information of each line in the reception order until the scan line reaches the bottom line of the region 1101.

FIG. 14 depicts a view for explaining the order in which the DMAC 324 reads out level data in the scan line order. The readout controller reads out, from the start address of the first line, an address where level information width is stored. In this case, the readout controller reads out the first level information width1 of the first line, and extracts width1 from the start address of the second line. After that, the readout controller reads out level data in an order indicated by arrows from start points in (1) to (8).

Figure 15:
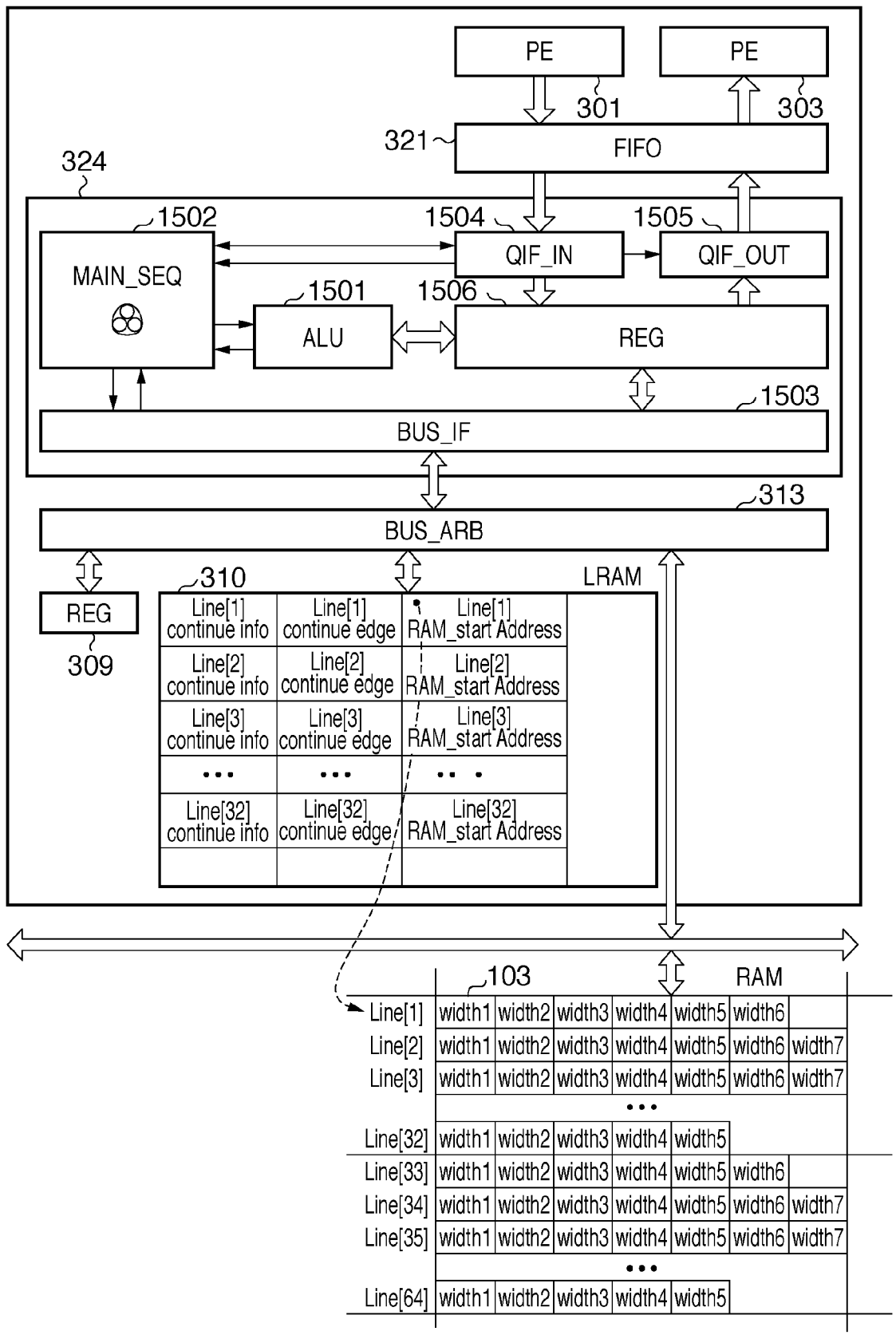
FIG. 15 depicts a view for explaining the arrangement of the DMAC 324, and the connection relationship with peripheral blocks shown in FIGS. 1 and 3.

FIG. 15 depicts a view for explaining the internal block arrangement of the DMAC 324, and the connection relationship with the peripheral blocks shown in FIGS. 1 and 3.

An ALU 1501 is an arithmetic unit which copes with only simpler operations (for example, addition, subtraction, and shift operation) than those by a general-purpose processor. A BUS_IF 1503 generates a transaction to the rendering bus 313. A QIF_IN 1504 and QIF_OUT 1505 are I/F units which execute bus control for data input from the PE 301 via the FIFO 321, and data output to the PE 303 via the FIFO 321. A REG 1506 is the register of the DMAC 324 and is controlled by the ALU 1501. A MAIN_SEQ 1502 is a sequencer which controls the ALU 1501, BUS_IF 1503, QIF_IN 1504, QIF_OUT 1505, and REG 1506. The sequencer 1502 may be hardware logic which exclusively performs the operation described here, or one whose operation contents are programmable. The DMAC 324 can switch the operation mode and the like in accordance with information stored in the REG 309 by the CPU 101. The storage location of data managed by the DMAC 324 will be explained.

The RAM 103 stores the width[i] (level data) of all the lines (block lines) of the region 1101. For higher performance, data of two block lines may be stored. The local memory LRAM 310 stores the start address RAM_startAddress of each block line in the RAM 103, continuous level information continue info, and continuous level data continue data. Although not shown, information in the LRAM 310 may also be that of two block lines.

Figure 16:
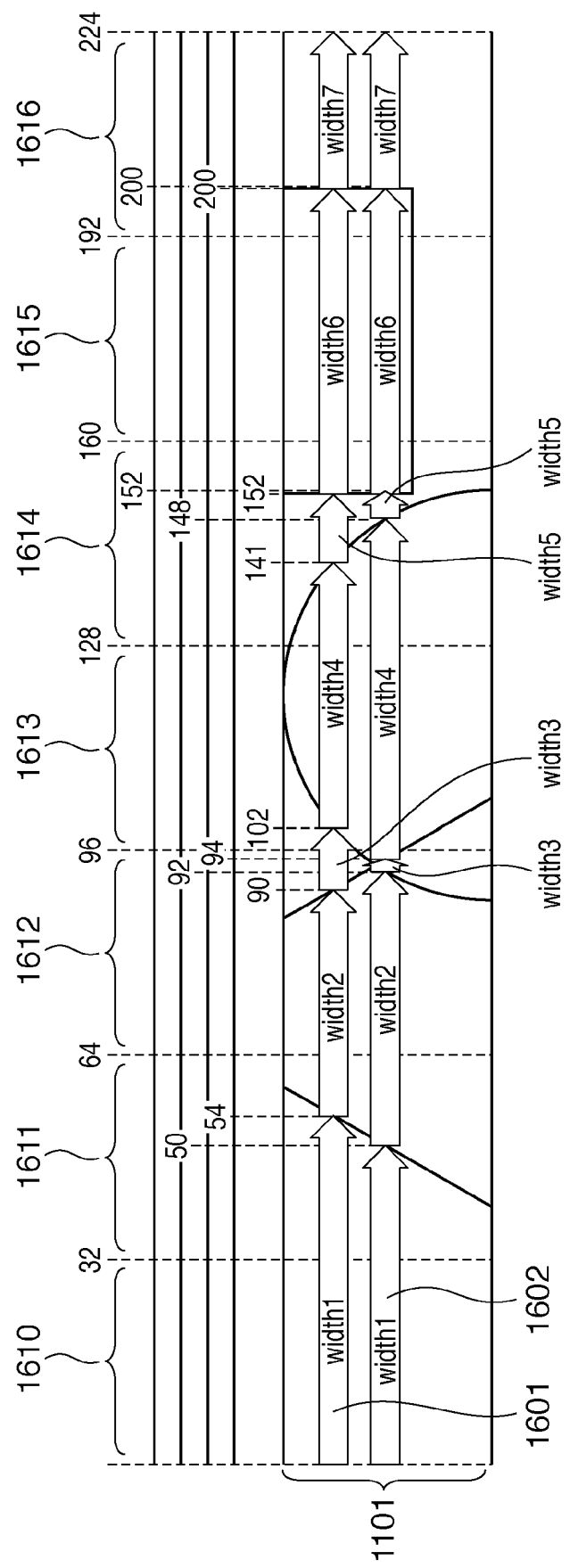
FIG. 16 depicts a view exemplifying the edge positions of rendering data of block lines shown in FIGS. 12A to 12F.
Figure 17A:
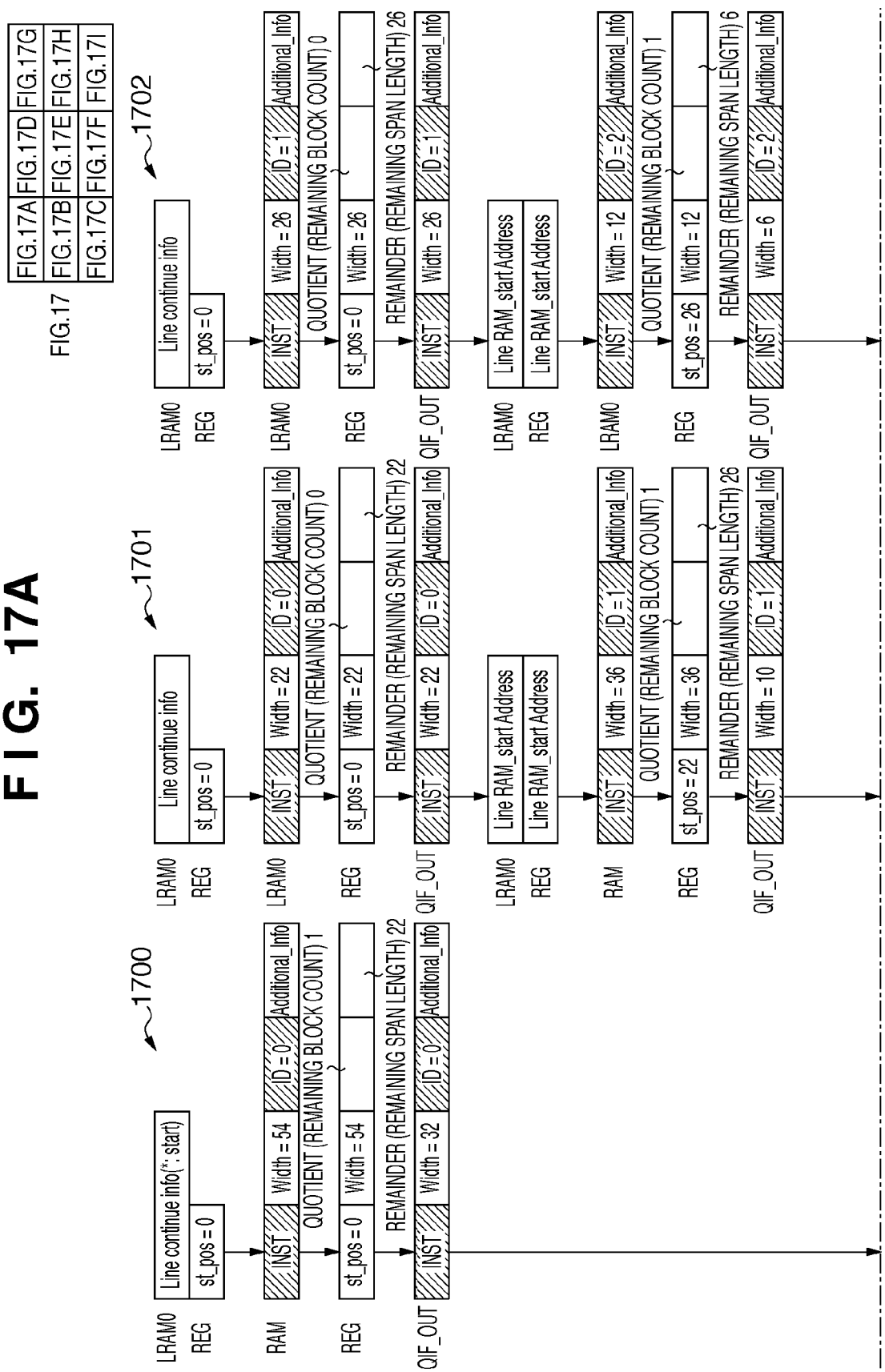
Figure 17C:
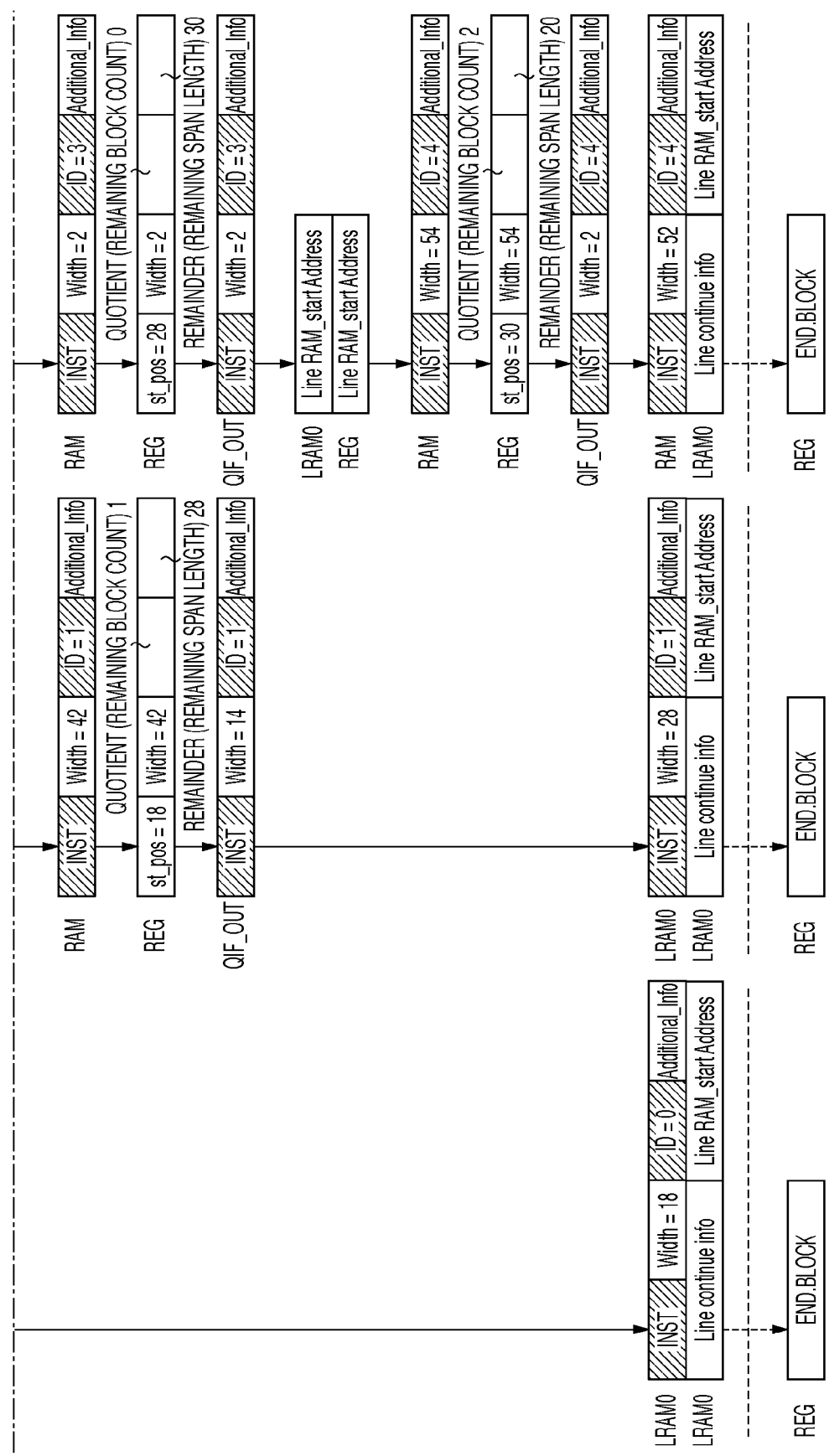
Figure 17E:
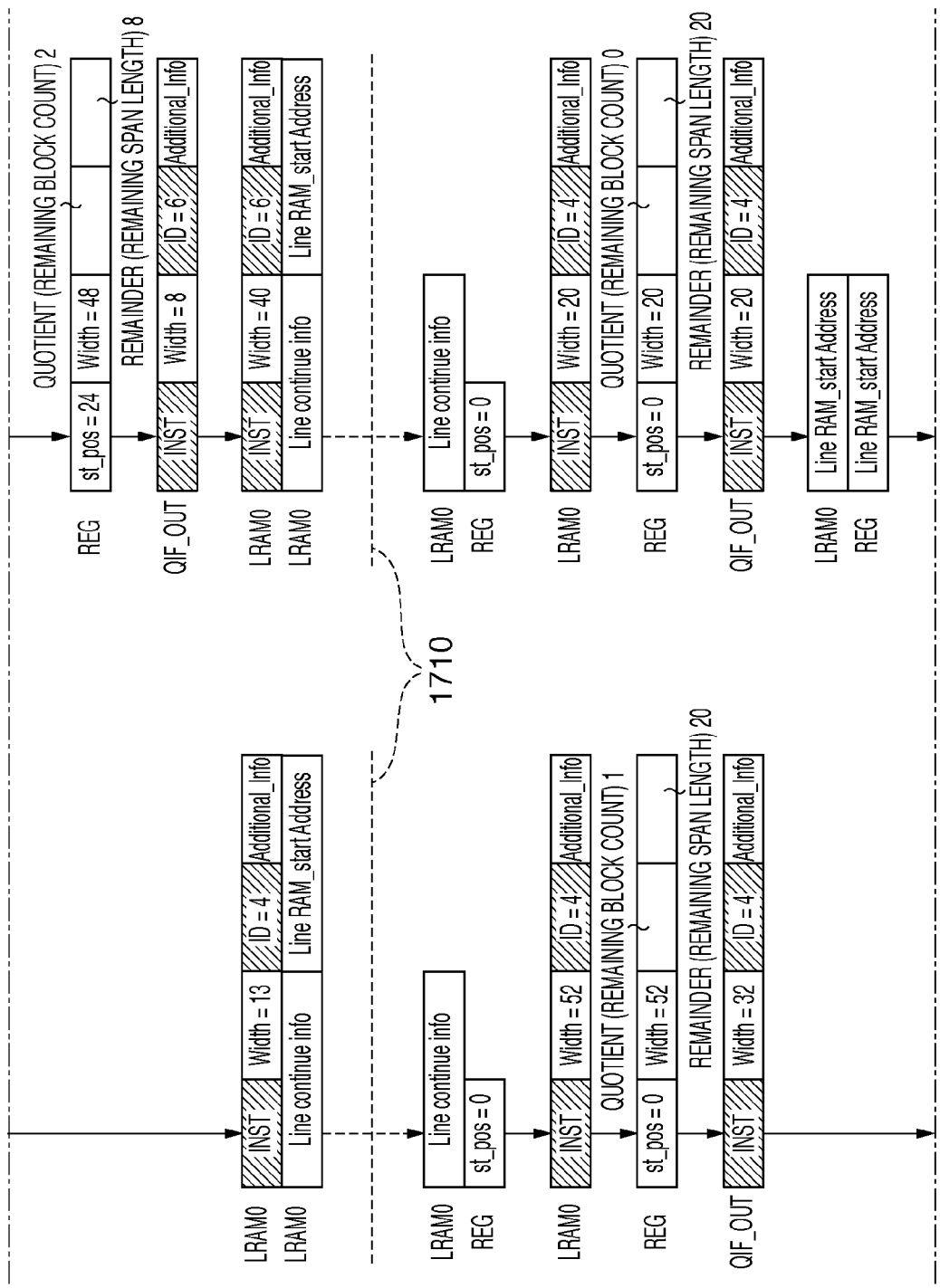
Figure 17F:
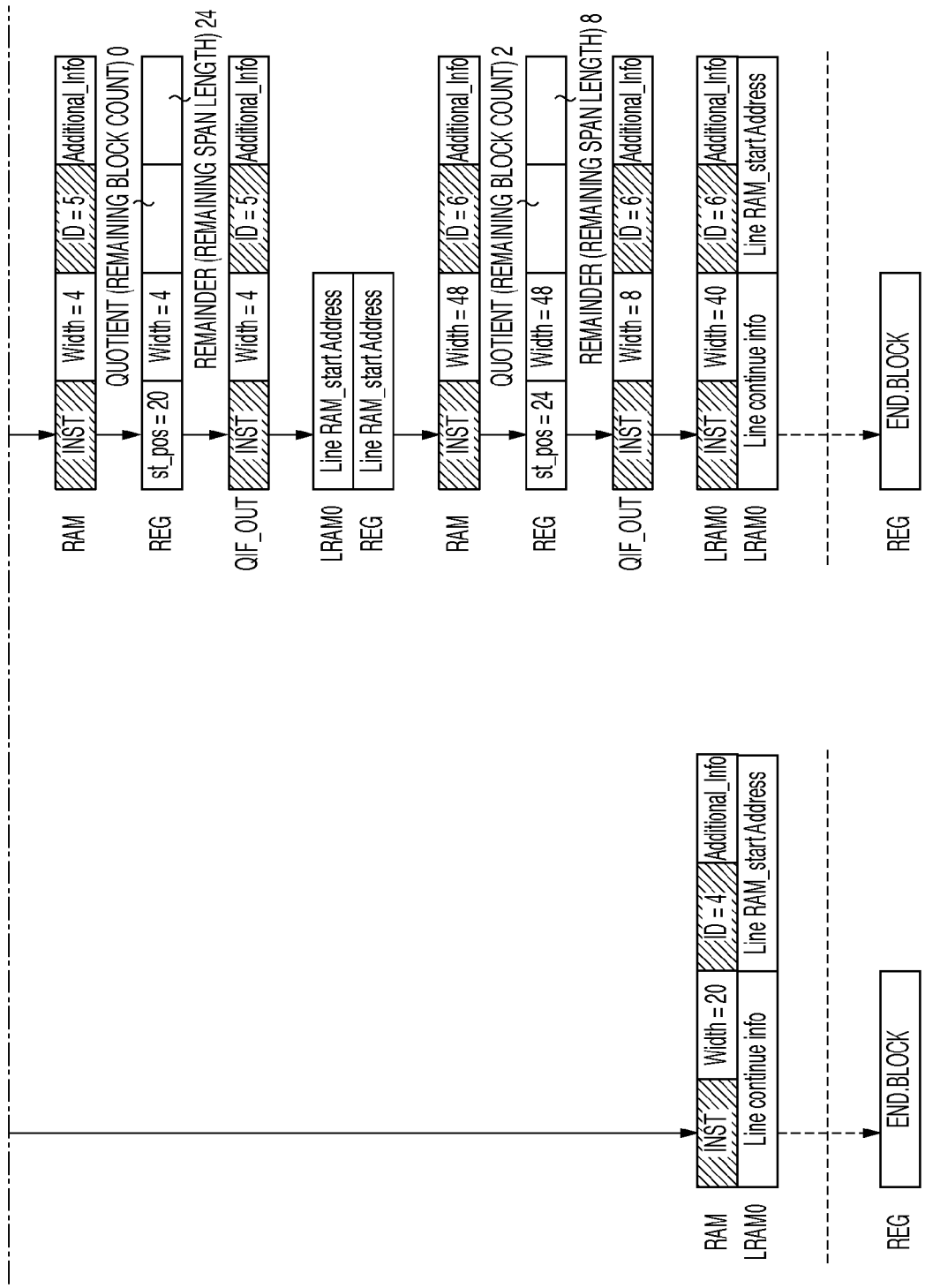
Figure 17H:
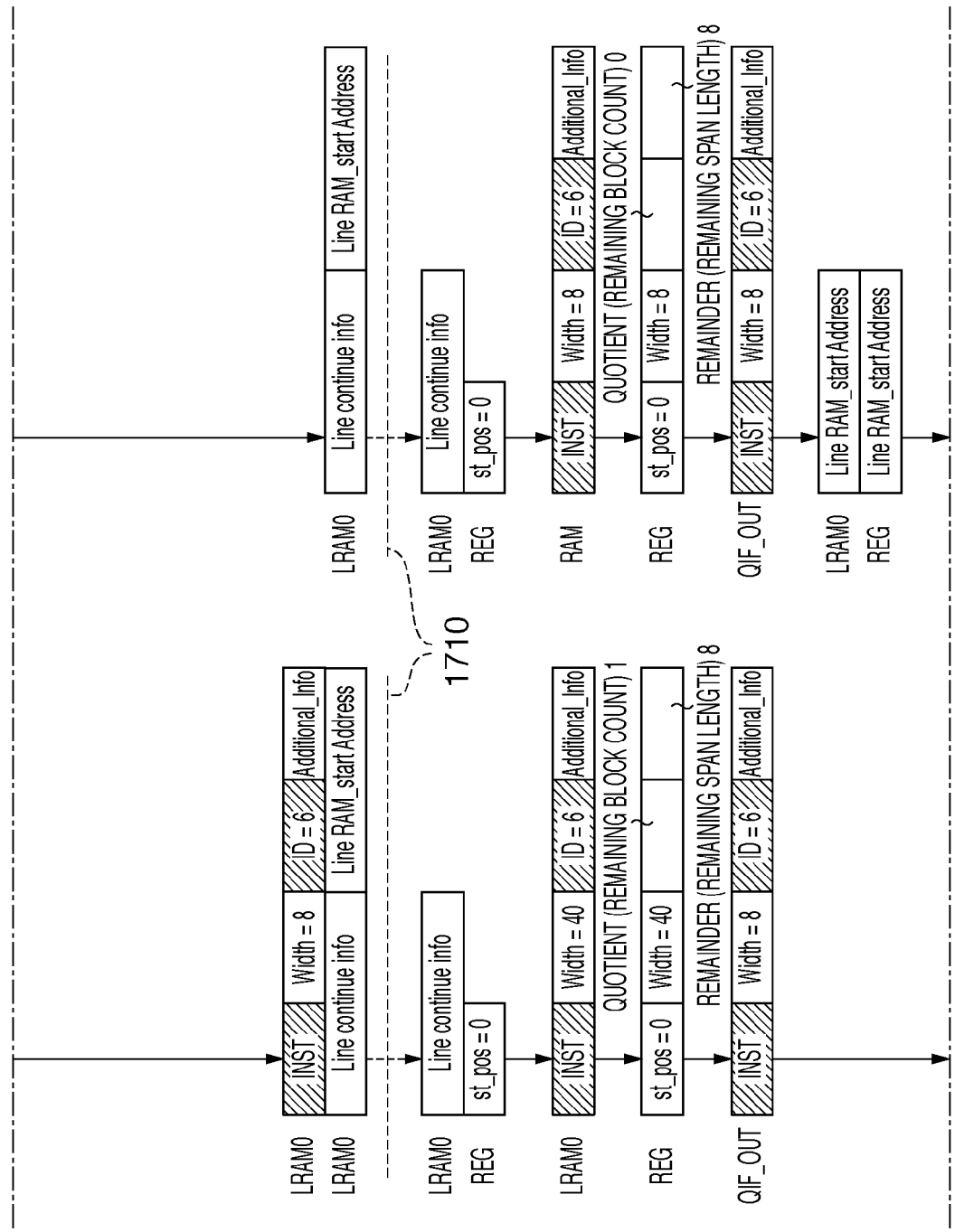
Figure 17I:
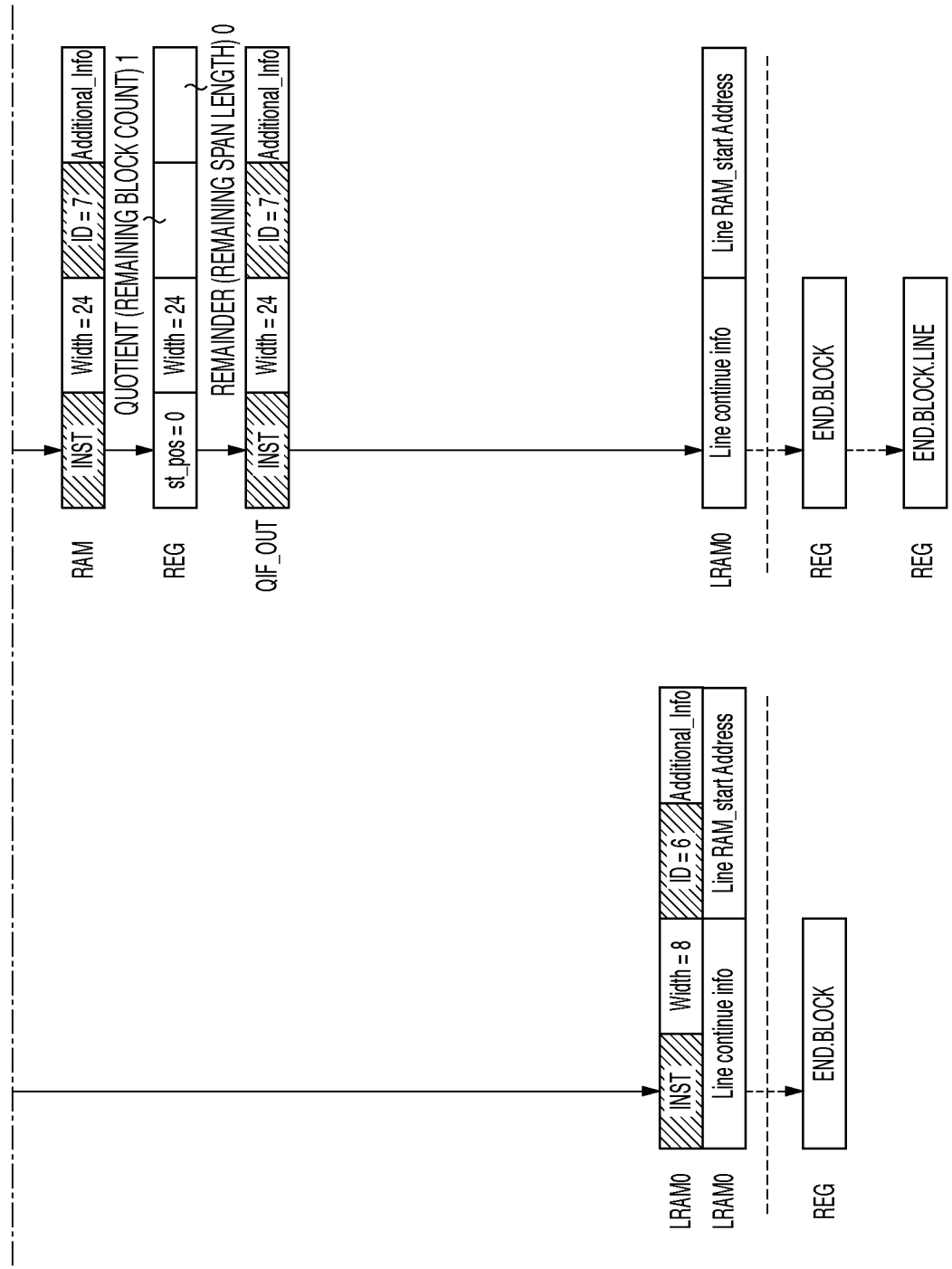

FIG. 16 depicts a view exemplifying the edge positions of rendering data of block lines shown in FIGS. 12A to 12F. The operation of the DMAC 324 for two lines 1601 and 1602 indicated by arrows in FIG. 16 will be described in detail with reference to FIGS. 17A to 17C. FIGS. 17D to 17I show the operation sequence of the DMAC 324.

FIGS. 17A to 17I show processes for blocks 1610 to 1616 shown in FIG. 16 in order from the leftmost block 1610. LRAM0 (310), REG, QIF_OUT, or the like on the left side indicates the readout destination or storage destination of each data set.

Reference numeral 1700 denotes transition of data which is processed by the DMAC 324 for the two lines 1601 and 1602 indicated by arrows in the leftmost block 1610 of block lines shown in FIG. 16. First, the DMAC 324 determines whether the positional coordinates (level data) of edge information continue from a previously processed block. In this case, the block 1610 is the first block, and thus the level data does not continue from a previously processed block (*start). Then, the DMAC 324 initializes the start coordinates in the block (st_pos=0). The DMAC 324 acquires address information of the RAM 103 which stores level data, and reads out the level data (width1=54 in this case) from the RAM 103. The DMAC 324 adds st_pos and width1, divides the sum by 32 by shift operation or bit extraction, and decomposes the result into the quotient and remainder. If the quotient is equal to or larger than "1", the processing for the current line of the block ends. Thus, the DMAC 324 subtracts st_pos from "32" (pixel count of the block in the main scanning direction), generates width information to be transferred to the PE 303, replaces the width part of the level data, and transfers the level data to the PE 303. Part of the level data transferred from the DMAC 324 to the PE 303 is used when processing the next block, and thus is temporarily stored in the continue data area of the LRAM 310. The DMAC 324 replaces the width information with "22" obtained by subtracting width (32 in this case) replaced for transfer from the original width (54 in this case), and stores the width information in the LRAM 310. Also, the DMAC 324 stores, in the continue information area (continue info area) of the LRAM 310, information indicating that the continuous level data (edge information) is stored in the LRAM 310. After that, readout & transfer processing of level data of one line in the leftmost block is completed.

After the end of processing several lines, the DMAC 324 reaches processing for the line 1602 corresponding to the lower arrow in FIG. 16. The DMAC 324 then performs data processing shown below a dotted line 1710 of 1700. Level data read out from the RAM 103 by the DMAC 324 is the same as that read out for the upper line, and only width information is different, so the same processing as that described above is executed except for handling of the width information. The DMAC 324 transfers width=32 out of width=50 to the PE 303, and stores the remaining width=18 in the LRAM 310. After the end of processing one block (32 lines), the DMAC 324 writes BLOCK_END information in the REG 1506, and shifts to processing for the next block.

Reference numeral 1701 denotes processing executed by the DMAC 324 after the end of processing 32 lines of the first block in 1700. The DMAC 324 acquires continue information and the address of the LRAM 310 from continue info, and reads out the level data stored in 1700 from the memory. In the LRAM 310, width is "22" obtained by subtracting "32" from width =54 generated by the PE 301. Since the sum of st_pos and width does not reach "32", the DMAC 324 sets "0" as the quotient. The DMAC 324 transfers the entire width "22" to the PE 303, and determines that the level data has ended. Subsequently, the DMAC 324 sets again, from the LRAM 310 to the internal address register, an address in the RAM 103 which stores new level information, and reads out the new level data from the RAM 103. The DMAC 324 reads out data of width =36. In this case, end_pos 58=22 (st_pos)+36 (width), and the quotient becomes larger than 1. Hence, the DMAC 324 transfers the level data width(10) to the PE 303. The DMAC 324 stores, as data used for the next block, "26" (width(36)−tr_width(10)) obtained by subtracting the transfer width "10" (tr_width=32−22 (end_pos)) from the original width(36). The DMAC 324 then stores "26" in the LRAM 310. This also applies to processing below the dotted line 1710 after several lines except that only the width information is different.

In cases 1702 and 1703, on the upper line, the first level data continues from the preceding block, and processing of the target block is completed for the second level data. As for 1702, objects overlap each other, as in the third block of FIG. 16, so there are three level data including continuous level data. The amount of data processed on the lower line differs between 1702 and 1703.

In 1704, the level data starts from one continuing from the preceding block. Even the second level data has a small width, and the DMAC 324 reads out another new level data from the memory. For the third level data, the DMAC 324 adds st_pos=24 and width=48, and divides "72" by the block pixel count (32) (shift operation (72/32)=2, remainder 8), obtaining the quotient "2" and the remainder "8". Also in this case, the DMAC 324 replaces width "48" of the level data to be transmitted to the PE 303 with "8", and transmits the level data.

After that, the DMAC 324 replaces width with "40" (width48−tr_width8), and stores it as continuous data in the LRAM 310.

In 1705, level data is formed from only single-color data which continues from the preceding block to the next block through the current block. To continuously use the level data until the next block, the DMAC 324 replaces width40 with width32, transfers width32, replaces the remaining width with "8", and stores width8 in the LRAM 310.

In 1706, the DMAC 324 transfers the data width8 stored for the preceding block to the PE 303, and reads out new level information from the RAM 103. The DMAC 324 determines that the remainder of the sum of st_pos=8 and width=24 is "0" and this value coincides with the pixel position of the block line end. At this time, the DMAC 324 transfers the original width24 (tr_width=32−st_pos8) to the PE 303. In the example represented by 1700 to 1705, no edge ends at the block end (position corresponding to a multiple of 32). If the edge ends at the block end on the block line, information indicating that no level data continues is written in continue info. In processing for the next block, the DMAC 324 reads out the information (continue info==0) indicating that no level data continues, acquires address information from RAM_start_Address, and processes new level information from the RAM 103.

Based on the above-described data transition, the DMAC 324 executes block information conversion information.

Figure 18B:
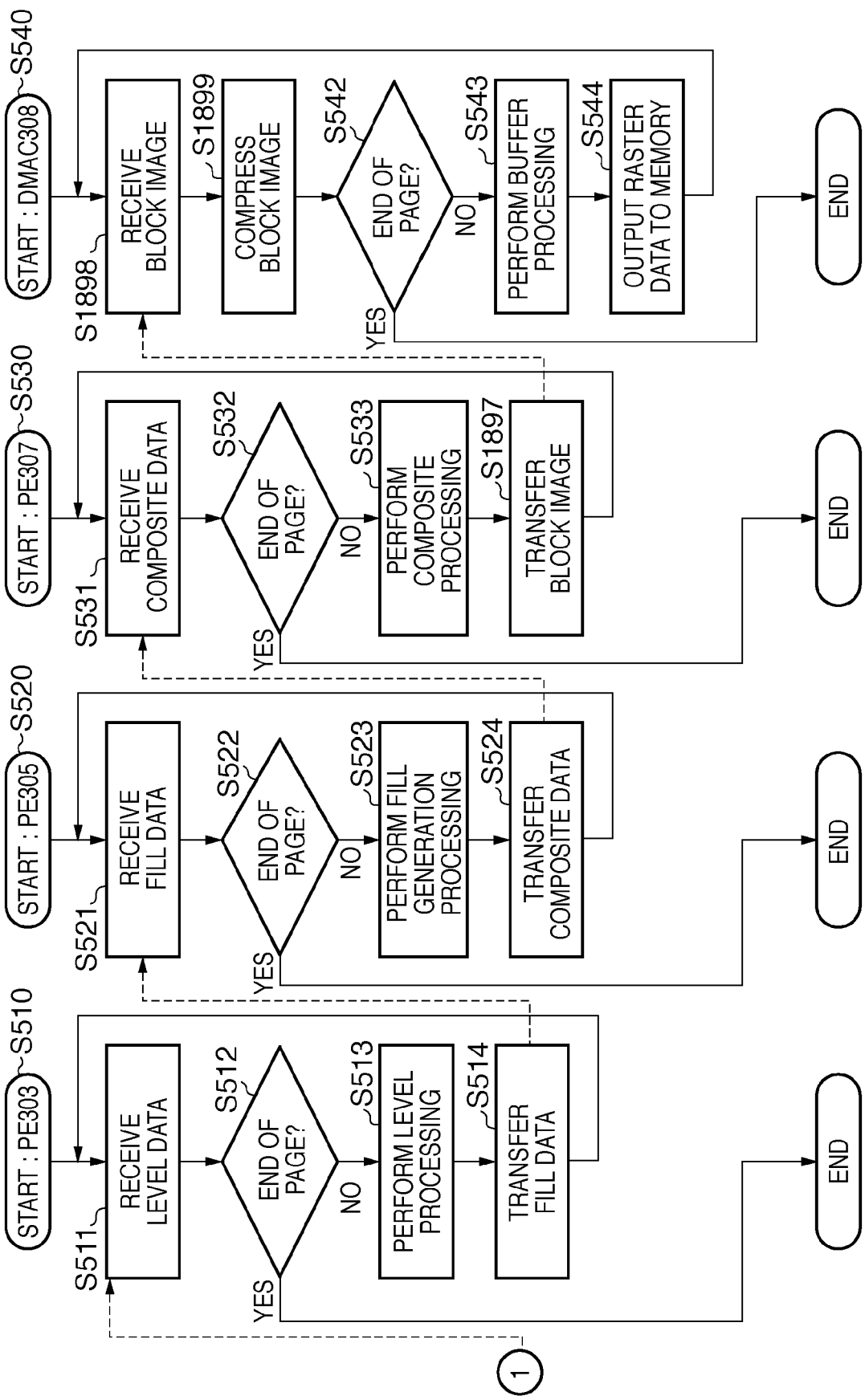
Figure 19A:
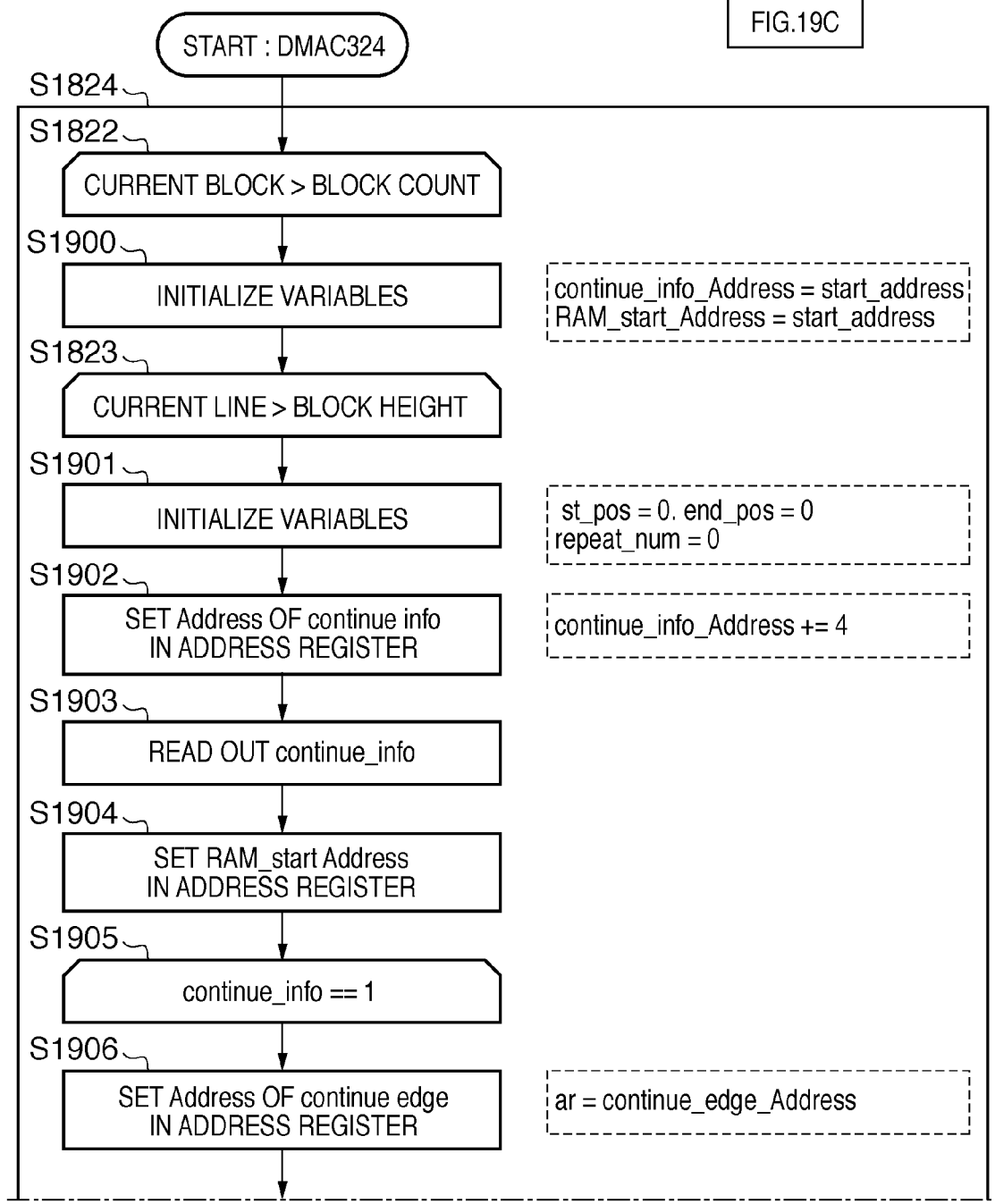
FIGS. 19A to 19C are flowcharts describing details of processing of the DMAC 324.
Figure 19B:
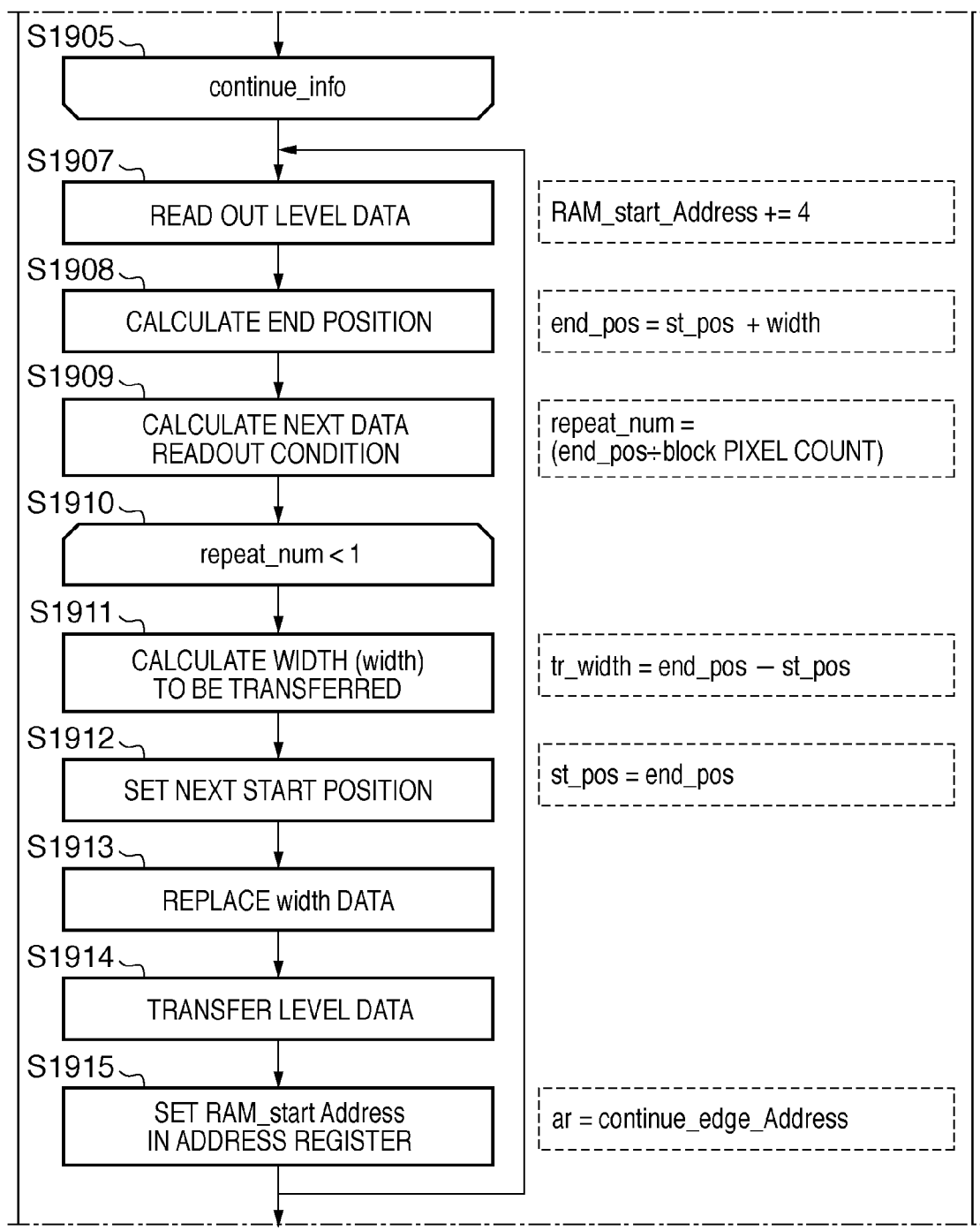
Figure 19C:
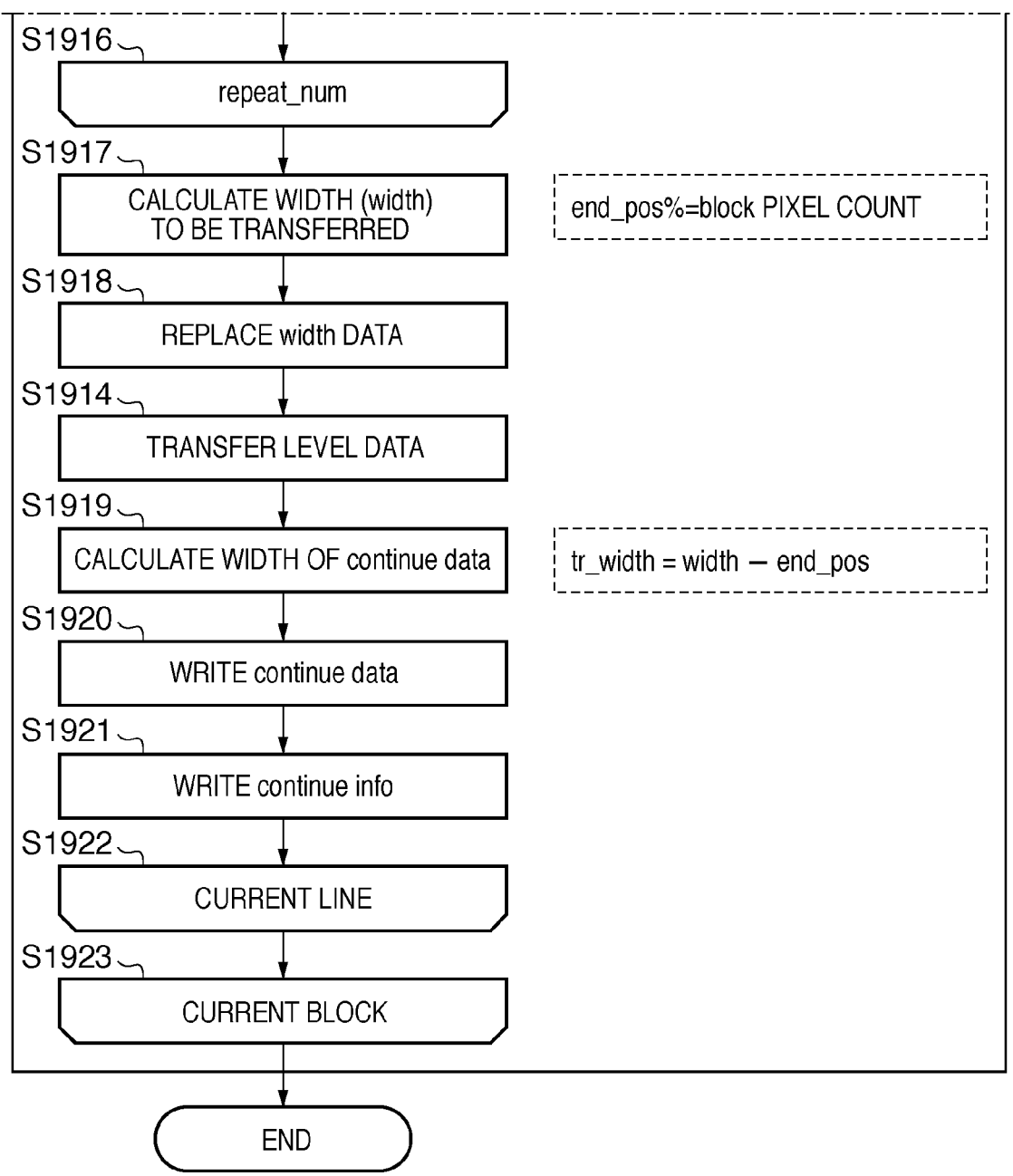

FIGS. 18A and 18B are flowcharts describing overall processing of the rendering unit 200 according to the embodiment. FIGS. 19A to 19C are flowcharts describing details of processing of the DMAC 324. FIGS. 18A and 18B are flowcharts showing an overall operation corresponding to block processing rendering by adding the operation of the DMAC 324 in step S1800 to the flowcharts shown in FIGS. 5A to 5E. The same reference numerals as those in FIGS. 5A to 5E denote the same steps, and a description thereof will not be repeated. In FIG. 18A, steps S508 and S509 are added. In step S508, the PE 301 executes sorting of edges as shown in FIG. 7. In step S509, the PE 301 calculates a span length to get space information.

Steps S1810 to S1818 show processing of writing data in the WORK_AREA 405 of the DMAC 324 by the DMAC 324 in the scan line order. Steps S1820 to S1827 show readout processing of converting the data in the WORK_AREA 405 in the block processing order.

First, level data write processing in steps S1810 to S1818 will be explained. In step S1810, the write sequencer (to be referred to as DMA1_WR) of the DMAC 324 performs initial setting. In step S1811, DMA1_WR determines whether or not data transferred from the PE 301 exists in the FIFO 321. If DMA1_WR determines in step S1811 that the data exists, the process advances to step S1812 to perform synchronous processing with the read sequencer (to be referred to as DMA1_RD) of the DMAC 324. In this case, the data may be managed by double buffers, or managed and synchronized by a single buffer. DMA1_WR reads data from the FIFO 321 301 in step S1813, and determines in step S1814 whether the data belongs to a new line. If the data belongs to a new line, that is, is the start data of a line, the process advances to step S1815 to store the address in the LRAM 310. The process advances to step S1816 to write the level data in the RAM 103, and DMA1_WR determines in step S1817 whether the block line ends. If the write of level data of block lines is completed in step S1817, DMA1_WR performs synchronous processing with DMA1_RD in step S1818, and determine whether to advance to processing for the next block line.

DMA1_RD performs initial setting in step S1820, and performs synchronous processing with DMA1_WR in step S1821. Repetitive processing by DMA1_RD takes a double loop structure in which processing is looped until the current block reaches the block count per block line in steps S1822 to S1826, and further looped until the current line count reaches the block line count (32 lines in this embodiment) in steps S1823 to S1825. In the repetitive processing of the double loop, DMA1_RD performs block conversion and transfer in step S1824.

The PEs 303, 305, 307, and 308 process data blocks generated by the DMAC 324 into a block image. In step S1897 in FIG. 18B, the PE 307 outputs the block image to the DMAC 308. The DMAC 308 receives the block image in step S1898 in FIG. 18B, and compresses the image in step S1899.

FIGS. 19A to 19C are views for explaining block conversion & transfer processing of DMA1_RD in step S1824 of FIG. 18A. Note that the same reference numerals as those in FIG. 18A denote the same steps, and a description thereof will not be repeated.

In step S1900, DMA1_RD initializes the continue info address and RAM_start_Address for each block. After executing step S1823, the process advances to step S1901 to initialize st_pos, end_pos, and repeat_num at the beginning of line processing in each block. In step S1823, DMA1_RD processes each line in the block. Then, DMA1_RD sets the continue info address in the address register of the internal REG and adds four bytes in step S1902. The process advances to step S1903 to read out continue info, and to step S1904 to set RAM_start_Address to be read out in the address register. If continue information "continue" is acquired, DMA1_RD sets (continue info==1) (step S1905). In step S1906, DMA1_RD reads out the continuous data storage address in the local memory LRAM 310, and sets it as the readout address in the address register.

In step S1907 (FIG. 19B), DMA1_RD reads out level data from the LRAM 310 or RAM 103, and shifts RAM_start_Address to the next level data (adds four bytes). The process advances to step S1908 to calculate the end position from (st_pos+width). In step S1909, DMA1_RD determines whether a value obtained by dividing end_pos (end position) read out in step S1908 by the block pixel count (32 in this embodiment) or shifting bits is smaller than "1". If the value is smaller than "1", the process enters loop processing in step S1910. The loop in step S1910 is executed to acquire new level data after transferring the current level data to the PE 303.

In step S1911 of this loop processing, DMA1_RD calculates width information of level data to be transferred (tr_width=end_pos−st_pos). The process advances to step S1912 to set the start position of subsequent level data (st_pos=end pos). It suffices to execute the processing in step 51912 between step S1912 and step S1915. The process advances to step S1913 to replace width information, and to step S1914 to transfer the level data to the PE 303. In step S1915, DMA1_RD sets RAM_start_Address of subsequent new level data in the address register, and returns to readout processing in step S1907 for the next level data.

If the result (repeat_num) of calculating end_pos is equal to or larger than "1", DMA1_RD transfers part of the level data to the PE 303, and stores the remaining level data as continuous data in the LRAM 310. If DMA1_RD determines that the level data is continuous one in step S1916 (FIG. 19C), it calculates a width (width) to be transferred as the remainder value of end_pos in step S1917. Thereafter, the process advances to step S1918 to replace the width part, and to step S1914 to transfer the level data to the PE 303. For continuous level data, data and continue information are generated by the following procedures.

First, in step S1919, DMA1_RD calculates width (tr_width=width−end_pos) of continuous level data. In step S1920, DMA1_RD replaces the width part of the level data, and writes the level data in the LRAM 310. After these processes, in step S1921, DMA1_RD writes, at a predetermined address in the LRAM 310, continue info indicating the presence of continuous level information (continue info=1). DMA1_RD repeats these processes for the lines of one block (steps S1916, S1922, and S1923), and performs synchronous processing with the sequence of DMA1_WR.

As described above, the sequence control function of executing simple calculation and data movement between the LRAM 310 and the DMAC is added to general-purpose DMA processing. Consequently, data which is generated from the rendering display list in the scan line order can be output in the block processing order. Processing of the processor element which performs rendering processing need not be changed between scan line processing and block processing, so the two rendering mode can coexist.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-044631, filed Mar. 1, 2010, which is hereby incorporated by reference herein in its entirety.

What is claimed is:

1. An image processing apparatus having a plurality of processors, for outputting a raster image in a unit of block, comprising:
   a first processor including a unit that interprets a display list and generates pieces of edge information of objects contained in one line, and a unit that sorts the pieces of edge information for each line, and transfers level data containing link information linking to width information of between the edges of the objects, the pieces of edge information and overlapping information of the objects;
   a DMA controller including an acquisition unit that acquires information about a pixel count of the block in a main scanning direction and a pixel count of the block in a sub-scanning direction, a management unit that receives the level data transferred from the first processor, and manages a storage location in a memory for the level data at a start of each line in accordance with the pixel count in the sub-scanning direction, a readout control unit that, when the level data corresponding to the pixel count in the sub-scanning direction is stored in the memory, controls a readout order of the level data to read out the level data from the memory, and a transmission unit that transfers the level data read out by the readout control unit to a second processor; and
   the second processor including a unit that extracts level information serving as the overlapping information of the objects from the level data transferred from the DMA controller, and a unit that sorts an overlapping order of the objects and transfers color information of the objects to a subsequent processor.

2. The apparatus according to claim 1, further comprising a third processor that fills the objects based on the color information of the objects.

3. The apparatus according to claim 2, further comprising a fourth processor that performs overlapping processing of the objects based on the sorted overlapping order of the objects.

* * * * *